(12) United States Patent
Poole et al.

(10) Patent No.: US 11,593,682 B2
(45) Date of Patent: *Feb. 28, 2023

(54) VISUALIZATION OF HIGH-DIMENSIONAL DATA

(71) Applicant: eBay Inc., San Jose, CA (US)

(72) Inventors: Maxwell Henry Poole, San Jose, CA (US); Ahmed Reda Mohamed Saeid Abdulaal, San Jose, CA (US); Ajay Narendra Malalikar, Sunnyvale, CA (US); Jonathan Ng, San Jose, CA (US); Harsha Nalluri, San Jose, CA (US); Craig H Fender, Morgan Hill, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/318,408

(22) Filed: May 12, 2021

(65) Prior Publication Data

US 2021/0264304 A1 Aug. 26, 2021

Related U.S. Application Data

(63) Continuation of application No. 16/745,792, filed on Jan. 17, 2020, now Pat. No. 11,036,607.

(Continued)

(51) Int. Cl.
*G06N 5/04* (2006.01)
*G06N 20/20* (2019.01)
(Continued)

(52) U.S. Cl.
CPC ........... *G06N 5/04* (2013.01); *G06F 11/3006* (2013.01); *G06F 11/328* (2013.01); *G06N 5/003* (2013.01);
(Continued)

(58) Field of Classification Search
CPC ........ G06F 11/328; G06F 20/20; G06F 20/11; G06F 20/3006
See application file for complete search history.

(56) References Cited

U.S. PATENT DOCUMENTS 6,643,613 B2 11/2003 Mcgee et al.
6,975,330 B1 12/2005 Charlton et al.
(Continued)

FOREIGN PATENT DOCUMENTS

CN 104915735 A 9/2015

OTHER PUBLICATIONS

Digital Viz Project; Radial Heat Map; https://web.archive.org/web/20160817094545/https://datavizproject.com/data-type/radial-heatmap/; Aug. 2016 (Year: 2016).*

(Continued)

*Primary Examiner* — Mohamed A. Wasel
*Assistant Examiner* — Jihad K Boustany
(74) *Attorney, Agent, or Firm* — FIG. 1 Patents

(57) ABSTRACT

A system is configured to detect a small, but meaningful, anomaly within one or more metrics associated with a platform. The system displays visuals of the metrics so that a user monitoring the platform can effectively notice a problem associated with the anomaly and take appropriate action to remediate the problem. A first visual includes a radar-based visual that renders an object representing data for a set of metrics being monitored. A second visual includes a tree map visual that includes sections where each section is associated with an attribute used to compose the set of metrics. Via the display of the visuals, the techniques provide an improved way of representing a large number of metrics (e.g., hundreds, thousands, etc.) being monitored for a platform. Moreover, the techniques are configured to (Continued)

expose useful information associated with the platform in a manner that can be effectively interpreted by a user.

20 Claims, 12 Drawing Sheets

Related U.S. Application Data

(60) Provisional application No. 62/897,164, filed on Sep. 6, 2019.

(51) Int. Cl.
| | |
|---|---|
| *G06Q 30/06* | (2012.01) |
| *G06Q 40/02* | (2012.01) |
| *G06N 5/00* | (2006.01) |
| *G06F 11/30* | (2006.01) |
| *G06F 11/32* | (2006.01) |
| *G06Q 30/0601* | (2023.01) |

(52) U.S. Cl.
CPC ......... *G06N 20/20* (2019.01); *G06Q 30/0633* (2013.01); *G06Q 40/02* (2013.01)

(56) References Cited

U.S. PATENT DOCUMENTS

| | | | |
|---|---|---|---|
| RE42,663 E | 8/2011 | Lazarus et al. | |
| 8,630,891 B2 | 1/2014 | Brocklebank | |
| 9,197,511 B2 | 11/2015 | Mathis | |
| 10,198,339 B2 | 2/2019 | Salunke et al. | |
| 10,636,007 B2 | 4/2020 | Runkana et al. | |
| 11,036,607 B2 | 6/2021 | Poole et al. | |
| 11,385,782 B2 | 7/2022 | Abdulaal et al. | |
| 2013/0169666 A1 | 6/2013 | Pacheco et al. | |
| 2013/0297767 A1* | 11/2013 | Kozine | G06F 11/34 709/224 |
| 2014/0075018 A1* | 3/2014 | Maycotte | H04L 67/306 709/224 |
| 2015/0033086 A1 | 1/2015 | Sasturkar et al. | |
| 2015/0213631 A1* | 7/2015 | Vander Broek | G06F 16/2477 345/589 |
| 2015/0229546 A1* | 8/2015 | Somaiya | H04L 67/10 715/736 |
| 2016/0147583 A1* | 5/2016 | Ben Simhon | G06F 11/076 714/47.3 |
| 2017/0083585 A1* | 3/2017 | Chen | G06F 11/323 |
| 2017/0093645 A1 | 3/2017 | Zhong et al. | |
| 2017/0192872 A1* | 7/2017 | Awad | G06F 11/3072 |
| 2017/0365080 A1 | 12/2017 | Cardno et al. | |
| 2018/0047071 A1 | 2/2018 | Hsu et al. | |
| 2018/0173894 A1* | 6/2018 | Boehler | G06F 21/6254 |
| 2019/0026206 A1* | 1/2019 | Harutyunyan | G06F 11/0781 |
| 2020/0159836 A1* | 5/2020 | Alkan | G06N 5/022 |
| 2020/0210264 A1* | 7/2020 | Lavrentyev | G06F 11/076 |
| 2021/0073099 A1 | 3/2021 | Poole et al. | |
| 2021/0073658 A1 | 3/2021 | Poole et al. | |
| 2021/0232291 A1 | 7/2021 | Abdulaal et al. | |

OTHER PUBLICATIONS

Final Office Action Received for U.S. Appl. No. 16/745,792, dated Nov. 16, 2020, 23 pages.

Non Final Office Action Received for U.S. Appl. No. 16/745,792, dated Sep. 22, 2020, Sep. 22, 2020, 21 Pages.

Notice of Allowability Received for U.S. Appl. No. 16/745,792, dated Apr. 1, 2021, Apr. 1, 2021, 2 Pages.

Notice of Allowance Received for U.S. Appl. No. 16/745,792, dated Mar. 10, 2021, Mar. 10, 2021, 10 Pages.

Janetzko et al., "Anomaly Detection For Visual Analytics Of Power Consumption Data", Computers & Graphics, vol. 38, Feb. 2014, pp. 27-37.

Koehrsen,"How to Generate Prediction Intervals with Scikit-Learn and Python", Retrieved from the Internet URL: https://towardsdatascience.com/how-to-generate-prediction-intervals-with-scikit-learn-and-python-ab3899f992ed, May 8, 2019, 14 pages.

Meinshausen,"Quantile Regression Forests", Journal of Machine Learning Research 7, 2006, pp. 983-999.

Raschka,"Mixtend 0.9.0", Retrieved from Internet URL: https://sebastianraschka.com/pdf/software/mlxtend-latest.pdf, 388 Pages.

Shi et al., "Visual Analytics of Anomalous User Behaviors: A Survey", Retrieved from the Internet URL: <https://arxiv.org/abs/1905.06720>, May 21, 2019, 24 pages.

Non Final Office Action Received for U.S. Appl. No. 17/228,235, dated Nov. 17, 2021, 24 Pages.

Ghenis,"Quantile loss regressin: from linear models to trees to deep learning", Retrieved from Internet URL: http://towardsdatascience/com/quantile-regression-from-li near-models-to-trees-to-deep-learning-af3 738b527 c3, Oct. 16, 2018, 14 Pages.

U.S. Appl. No. 17/228,235 , "Notice of Allowance received for U.S. Appl. No. 17/228,235, dated Mar. 17, 2022", dated Mar. 17, 2022, 11 Pages.

U.S. Appl. No. 17/228,235, "Supplemental Notice of Allowability", U.S. Appl. No. 17/228,235, filed Jun. 15, 2022, 2 pages.

"Extended European Search Report" received for European Patent Application No. 22165862.8, dated Aug. 26, 2022, 10 Pages.

U.S. Appl. No. 17/752,113, "Non-Final Office Action", U.S. Appl. No. 17/752,113, dated Dec. 22, 2022, 24 pages.

\* cited by examiner

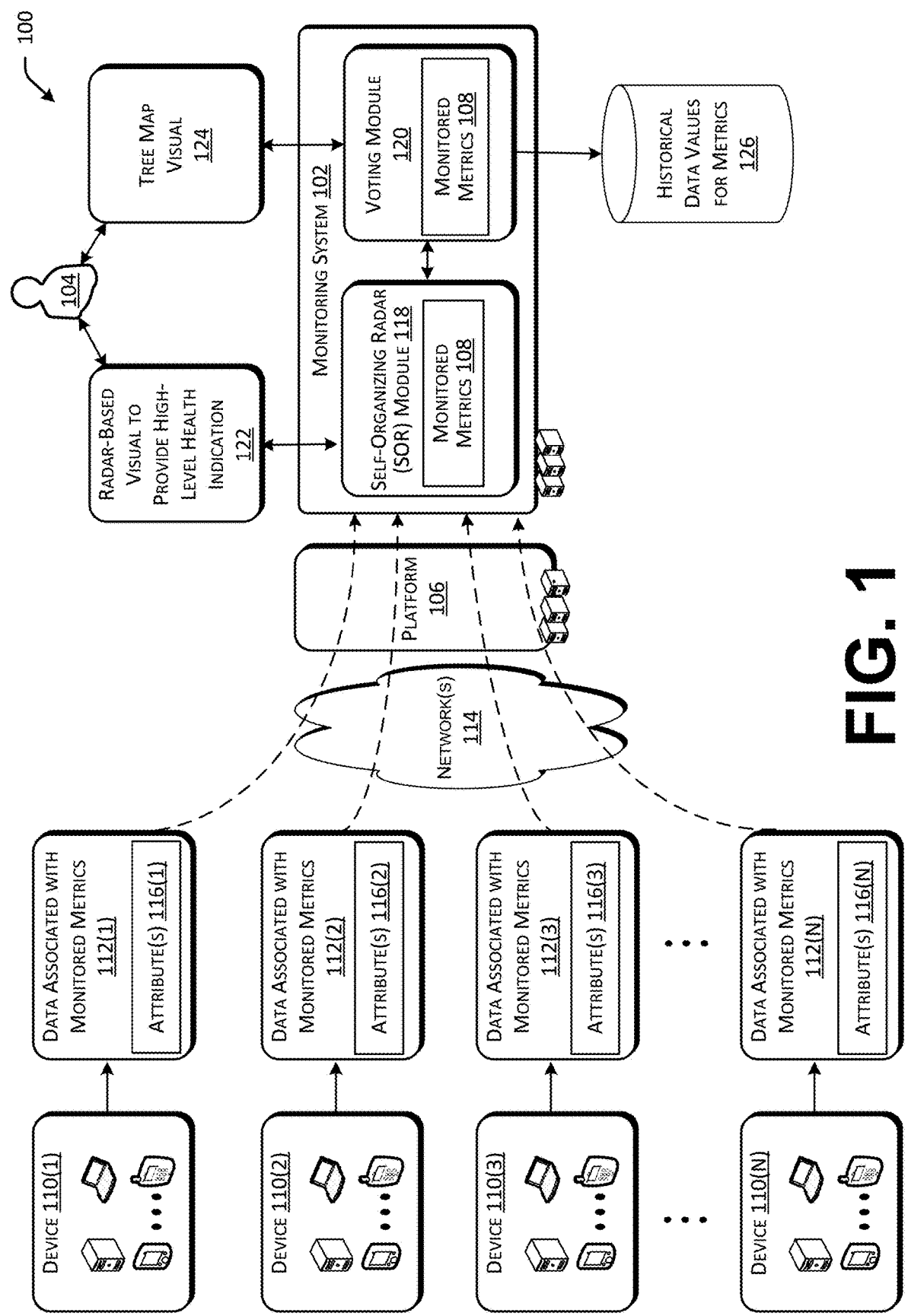

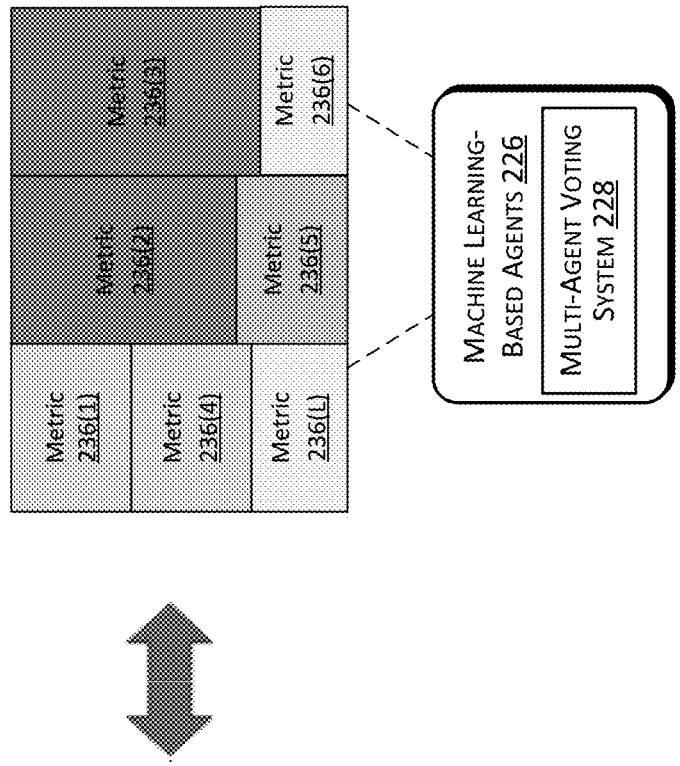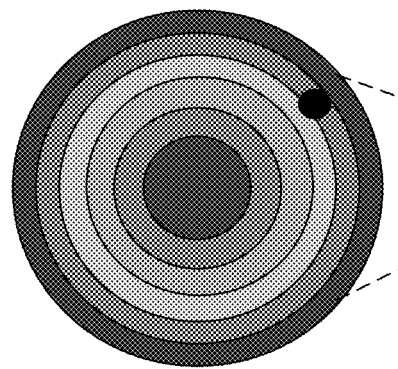
FIG. 2B

VISUALIZATION OF HIGH-DIMENSIONAL DATA

PRIORITY APPLICATION

This application is a continuation of U.S. patent application Ser. No. 16/745,792 filed on Jan. 17, 2020, which claims the benefit of and priority to U.S. Provisional Application No. 62/897,1664, filed Sep. 6, 2019. The entire disclosures of these applications are incorporated by reference herein.

BACKGROUND

Machine learning is increasingly being utilized to perform a variety of tasks where patterns and inferences may be analyzed to monitor for problems that can arise in a system, such as a platform that hosts a website. More specifically, anomaly detection algorithms can be used to detect meaningful anomalies (e.g., deviations) to a set of metrics associated with the platform. Many of these anomalies are easily detected and/or noticed because they are represented by large dips or large spikes in the metrics being monitored. For instance, a metric being monitored may experience an unexpected and sharp decrease in data values over a short period of time (e.g., thirty seconds, two minutes, five minutes, etc.). Or, a metric being monitored may experience an unexpected and sharp increase in data values over a short period of time.

However, conventional anomaly detection algorithms are largely ineffective with regard to detecting small, but meaningful, anomalies that may be helpful in identifying a problem within a system before more serious consequences are realized. Consequently, conventional anomaly detection algorithms are unable to detect what may be referred to as a "slow bleed" anomaly, or a scenario where an actual data value for a metric being monitored is slightly different than an expected data value for the metric, but this slight difference may be a meaningful signal of a growing problem a platform is experiencing.

Additionally, conventional systems that implement these anomaly detection algorithms lack the ability to display information being generated in a way that enables a user monitoring hundreds of metrics associated with a platform to effectively interpret the information and take appropriate action to remediate a problem.

It is with respect to these and other technical considerations that the disclosure made herein is presented.

SUMMARY

The techniques described herein are configured to detect a small, but meaningful, anomaly within one or more metrics associated with a platform being monitored. The techniques are configured to display visuals of the metrics so that a user monitoring the platform can effectively notice a problem associated with the anomaly and take appropriate action to remediate the problem. Moreover, the techniques use an ensemble of machine learning algorithms, with a multi-agent voting system, to detect the anomaly. Therefore, via the display of the visuals and the implementation of the machine learning algorithms, the techniques described herein provide an improved way of representing a large number of metrics (e.g., hundreds, thousands, etc.) being monitored for a platform. Moreover, the techniques are configured to expose actionable and useful information associated with the platform in a manner that can be effectively interpreted by a user.

The techniques described herein may be used in a scenario where one or more users are tasked with monitoring a set of metrics related to a platform, in real-time, in order to triage potential problems and/or take appropriate remedial actions. For example, users of a Site Reliability Engineering team may be tasked with monitoring hundreds or thousands of metrics related to a platform that supports a website. The metrics being monitored may relate to a particular function or process of the platform, such as the ability for customers to purchase items via an electronic commerce site. In a more specific example, the metrics being monitored may relate to one or more of a customer being able to sign in, a customer being able to check out, and so forth. The techniques may be used in other scenarios as well.

In some embodiments, a broader category of metric, such as "checkout", can be divided into multiple sub-category metrics (e.g., "checkouts_completed" and "checkouts_cancelled"). Moreover, a metric may include varying attributes. For instance, the attributes can relate to a location in which a customer is purchasing an item from a website, a type of device being used to purchase the item, a payment method being used to pay for the item, and so forth. Accordingly, the set of metrics being monitored can be expansive and can quickly stretch into the hundreds or thousands depending on the function or process of a platform being monitored, a number of categories and/or sub-categories that compose the metrics, and/or a number of attributes that can vary from one metric to the next.

To further illustrate how attributes can vary, a "checkouts_completed" metric can have individual metrics for check outs by customers in different countries, such as the United States of America, Great Britain, Australia, France, Russia, South Africa, Brazil, etc. The "checkouts_completed" metric can additionally have individual metrics for check outs performed using different types of devices, such as IPHONE devices, ANDROID devices, and/or other types of devices. The "checkouts_completed" metric can further have individual metrics for check outs in which items are paid for using different payment methods, such as PAYPAL, a credit card, and/or other types of payment methods. An individual metric can include one or multiple attributes, and one varying attribute may result in a different metric being monitored. For example, the following are different "checkout" metrics that may be monitored:

an "checkouts_completed_overall" metric (e.g., all checkouts implemented using the platform regardless of location, device, and payment method), a "checkouts_completed_USA_IPHONE_PAYPAL" metric, a "checkouts_completed_AUSTRALIA_IPHONE_PAYPAL" metric, a "checkouts_completed_USA_ANDROID_PAYPAL" metric, a "checkouts_completed_USA_IPHONE_creditcard" metric.

Based on the description above, one can see that the number of metrics being monitored can be large and can quickly grow as the platform supporting a website expands to accommodate different locations, different devices, different payment methods, and/or other distinguishing attributes. The system described herein helps reduce the complexities in monitoring a large number of metrics for anomalies by generating and displaying multiple visuals that represent data (e.g., real-time or near real-time data values) associated with the metrics being monitored. Using the data associated with the metrics being monitored, the system can generate and display a first visual to provide a high-level indication of whether the platform is healthy. A platform may be healthy when the data values associated with the metrics are not deviating from expected or predicted data values in a meaningful manner. The first visual can be updated in real-time as the data associated with the metrics continues to be received by the system.

Technical advantages of user interfaces described herein include the ability to monitor hundreds or thousands of metrics in real-time using a visual, such as a radar-based visual. This leads to scalability and efficiency because so many metrics may be monitored and displayed at once. Because traditional methods of metrics display may be avoided, this also leads to a more memory and CPU efficient method of metrics display. Still further, because the visualization of many metrics is possible in a compact form, the visual may also be technically advantageous for monitoring many metrics on a compact computer device, such as a mobile phone with a limited size display screen. In addition, the user is more efficient because the user can quickly check a visualization of many metrics, such as the radar-based visual, and the user can accurately link to any metric that shows a problem.

In various examples, the first visual may be a radar-based visual on which an object (e.g., a dot) derived from the underlying data can be plotted. The first visual can be generated using an unsupervised artificial neural network algorithm that projects high-dimensional data onto a two-dimensional map. For instance, the first visual may be generated using a custom modification of self-organizing map (SOM). The self-organizing map may be built using a broader category of metrics, such as those related to a customer checking out.

An object plotted on the radar-based visual can represent data associated with a combination of metrics related to an aspect of the platform being monitored (e.g., "checkouts_completed"). The way in which the radar-based visual is configured for display enables the object to signal anomalous activity associated with the combination of metrics. For example, a location of the object is determined based on matching current, real-time data associated with the combination of metrics to a closest observation of historic data of the combination of metrics. Accordingly, regions towards the center of the radar-based visual may represent more common scenarios that are frequently observed for the data. Regions towards the periphery of the radar-based visual represent more uncommon scenarios that are less frequently observed for the data. As a result, anomalous activity may be signaled as the plotted location of the object moves toward the periphery of the radar-based visual over time. In contrast, if the plotted location of the object remains towards the center of the radar-based visual, then the plotted location of the object may signal normal activity associated with the combination of metrics. The movement of the object from the center towards the periphery of the radar-based visual can be viewed by a user over time, and the user can use his or her judgment to determine whether an issue should be further investigated based on the location of the object.

The radar-based visual can include different color regions and/or shades to help signal a problem. For example, the inner part of the radar-based visual around a center point may be different shades of blue (e.g., darker shades of blue toward the center that turn to lighter shades when looking outward toward the periphery). The outer part of the radar-based visual may be different shades of red (e.g., darker shades or red toward the periphery that turn to lighter shades when looking inward toward the center). A user can notice when the object starts to move from a darkly-shaded blue region near the center of the radar-based visual, which can be a strong signal of normal activity for the combination of metrics represented by the object, towards a darkly-shaded red region near the periphery of the radar-based visual, which can be a strong signal of anomalous activity for the combination of metrics represented by the object.

Another signal of an anomaly can include an increase in a size of the object (e.g., the size of a dot). A size of the object represents a degree to which the real-time data for the combination of metrics is anomalous to the observed historic data. It is possible that that the object may be located near the center of the radar-based visual, yet one or more of the real-time metric values is foreign and is not commonly seen in the historical data. In a specific example, a large number of metrics being monitored may have normal values that closely match historical observations, but a small number of metrics (e.g., one, two, three, etc.) being monitored may have real-time values that are not commonly observed or that have never been observed before (e.g., foreign values). In this situation, the increased size of the object can be used to signal the anomaly because the location of the object is likely to be plotted towards the center of the radar-based visual due to the normal observations of the larger number of metrics.

In some examples, the movement of a plotted object and a size of the plotted object can work together to signal an anomaly. This may be useful because a plotted object in a red region alone may occur due to an impact of a peak period, a slow period, or some other factor that may signal an abnormality but may not entirely be abnormal. Accordingly, a size of the plotted object can provide a strong indication of the anomalous behavior because the size of the plotted object can indicate that this observation has not occurred before during training.

Using the data associated with metrics being monitored, the system can also generate and display a second visual. The second visual enables a user to localize a problem to a smaller group of metrics being monitored. Stated another way, the second visual allows a user to determine which metrics, out of hundreds or thousands of metrics being monitored, are experiencing anomalous activity.

In various examples, the second visual may be a tree map visual that includes a plurality of sections. Each section in the tree map visual can be associated with a specific attribute used to compose one or more of the metrics being monitored (e.g., the "checkout" metrics). A size and/or a color of an individual section can be used to indicate anomalous activity for the specific attribute. As described above, the specific attribute may be a location of multiple different locations from which customers can purchase an item via an electronic commerce site and supporting platform (e.g., the United States of America, Great Britain, Australia, France, Russia, South Africa, Brazil, etc.), a type of device of multiple different types of devices that can be used by customers to purchase an item via the electronic commerce site and supporting platform (e.g., IPHONE, ANDROID, etc.), a payment method of multiple different payments methods that customers can use to purchase an item via the electronic commerce site and supporting platform (e.g., PAYPAL, credit card, etc.), and so forth.

A user can interact with the tree map visual to localize the problem to a smaller group of metrics. For example, the user may notice a larger, red section in the tree map visual which signals anomalous activity for a specific attribute (e.g., the United States of America, IPHONE, PAYPAL, etc.). The user may then select the section associated with the specific attribute. The system receives the user input that selects the section of the tree map visual and updates both the radar-based visual and the tree map visual so that only metrics related to the specific attribute are represented. In other words, a smaller group of metrics, which are related to the specific attribute, are used to rebuild one or both of the radar-based visual and the tree map visual based on the user input.

Consequently, the system described herein provides a real-time, interactive application where a user may initially notice a problem by viewing an object that is growing in size and/or moving towards or in the periphery of the radar-based visual, and then the user can interact with the tree map, or other detailed visualization visual, to better understand the problem. It is to be appreciated that the radar-based visual may show one or more objects, and each object may represent multiple metrics.

In various examples described herein, the radar-based visual that initially provides a high-level overview of the health of the platform can be generated using a modified version of the "self-organizing map" (SOM) algorithm (i.e., "Kohonen's network"). The SOM algorithm achieves low-dimensional views of high-dimensional data. For example, high-dimensional data can be mapped into a two-dimensional data matrix using the algorithm and then the two-dimensional data matrix can be visualized as a heatmap. The modified version of the SOM algorithm accounts for time-series data and alters the output representation so that a symmetric radar-based visual is displayed. Thus, the modified version of the SOM algorithm may be referred to herein as the "self-organizing radar" (SOR) algorithm.

The way in which the radar-based visual is configured enables an object representing a combination of metrics to generally signal anomalous activity as the plotted location of the object moves or is located toward the periphery of the radar-based visual over time. In contrast, if the plotted location of the object remains towards the center of the radar-based visual, then the plotted location of the object generally signals normal activity associated with the combination of metrics. This provides an effective and an efficient way for a user to notice a problem early on before the problem fully develops and causes more serious consequences. Compared to conventional techniques, the user is not required to examine or interpret large amounts of complicated information, such as mathematical equations, numerical values/coefficients, value comparisons to thresholds, multiple charts, etc., in order to determine that a problem exists.

In various examples described herein, the tree map visual can be generated using a multi-agent voting system of various machine learning agents. In one embodiment, an agent is a regression model coupled with a Quantile Loss Gradient Boosted Trees (QLGBT) machine learning model for vote-decision making. The system analyzes the metrics being monitored and determines which metrics are highly correlated to distribute on the agents. For instance, the system can use independent regressors to determine that a first metric and a second metric satisfy a correlation threshold, and therefore are highly correlated and can be assigned to one or more agents. If a first metric and a second metric are highly correlated, a data value for the first metric can be confidently used by an agent to predict a data value for the second metric using the agent's regression method of choice (e.g., polynomial regression). In a more specific example, a historic analysis of data values can be used to identify a correlation in which a data value for a "checkouts_completed" metric can be used to predict a data value for a "checkouts_cancelled" metric. In another specific example, a historic analysis of data values can be used to identify a correlation in which a data value for a "checkouts_completed_France" metric can be used to predict a data value for a "checkouts_completed_overall" metric.

Given two highly correlated metrics, an agent generates a prediction model so that a data value of a first metric can predict a data value for a second metric. A prediction model can be generated for each set of highly correlated metrics by multiple different agents. Provided an actual data value for a particular metric, an agent is configured to compare the actual data value to the data values predicted by the agent's prediction model generated in association with the particular metric. The agent then uses its own prediction error and/or other exogenous factors, such as temporal factors, holiday factors, etc., to generate upper and lower quantile limits, or bounds, on the error using QLGBT. If the error in a predicted data value falls outside a confidence interval (e.g., the upper and lower bounds) when compared to the actual data value, then the agent provides a vote that signals an anomaly. In other words, a vote by an agent means that an error in predicting a data value for a metric was outside an acceptable error range. In various examples, the error is a normalized error (e.g., a percentage) that is agnostic to the scale of the data. In other examples, the error may be an absolute error.

The vote is associated with a particular metric based on whether the error falls outside the upper bound or the lower bound. For example, a first correlated metric may be associated with the upper bound and a second correlated metric may be associated with the lower bound. The agent may use this approach when an anomaly is associated with a decrease in values (e.g., a dip). If the error in predicting the data value is outside the upper bound, the first correlated metric receives the vote and is therefore the voted metric. If the error in predicting the data value is outside the lower bound, the second correlated metric receives the vote and is therefore the voted metric. In another example, the first correlated metric may be associated with the lower bound and the second correlated metric may be associated with the upper bound. The agent may use this approach when an anomaly is associated with an increase in values (e.g., a spike).

Once the votes are received from all the agents associated with a large correlated set of metrics being monitored (e.g., hundreds, thousands, etc.), the system can analyze the agents determined to be associated with the voted metric, and localize a problem to a specific attribute. The system can examine all the agents to determine a total number of agents that share an attribute (e.g., a location such as the United States of America) with the voted metric, without regard to whether the agent voted or not. Moreover, system can examine the voting agents to determine a number of the voting agents that share the same attribute (e.g., the location such as the United States of America) with the voted metric.

If a percentage determined based on the number of the voting agents that share the attribute and the total number of agents that share the same attribute is greater than a predetermined threshold percentage (e.g., a percentage between seventy percent and ninety percent), then the system can determine that the problem is likely localized to that attribute. In a specific example, a threshold can be set to seventy-five percent, and thus, if eighty out of a total of one hundred agents that use a metric related to the United States of America attribute provide a vote signaling an anomaly, then the system can localize a problem to a specific location, i.e., the United States of America.

The system can use this information in the tree map visual to show that there may be a problem with respect to a particular attribute, such as the United States of America. That is, the system can increase the size and/or change the color of the section in the tree map visual that corresponds to the particular attribute. In one embodiment, the size and/or the color of a section is related to a percentage of agents that vote for an error within a specific localization (e.g., a specific attribute).

Using a machine learning model, such as but not limited to the Quantile Loss Gradient Boosted Trees (QLGBT) machine learning model, to model an individual agent's decision within a multi-agent voting system, the system is able to provide higher sensitivity to a "slow bleed" anomaly, or a scenario where an actual data value for a metric is slightly different than an expected data value for the metric, but the slight difference may be a meaningful signal of a growing problem a platform is experiencing. Use of the multi-agent voting system also provides a higher resistance to false positives, because while a false positive in a single agent is likely, the chances of simultaneous occurrences of false positives in a larger number of agents is lower. Moreover, the diversity of the agents with respect to their assigned metrics, exogenous variables, and models used overcomes the bias resulting from the vulnerability of using a single model or limited set of metrics. Accordingly, the machine learning-based multi-agent voting system comprises a problem inference tool rather than a mere outlier detection tool.

While some of the examples described above relate to health monitoring of a website such as an electronic commerce site, the techniques can additionally or alternatively be applied to other examples in which other metrics and/or other platforms are being monitored. For instance, the techniques described herein can be used to: display visuals representing active listings and market status for a seller of items, to display visuals representing the segmentation of search results, or to display visuals representing a post-processing layer on top of a variety of possible artificial intelligence (AI) outputs. Equally, the examples above may be applied to other performance metrics, such as monitoring machine metrics in a data center, such as CPU utilization, memory utilization, disk activity, or other metrics.

It should be appreciated that the subject matter described above and in further detail below can be implemented as a computer-controlled apparatus, a computer-implemented method, a computing device, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

FIG. 1 is a diagram illustrating an example environment in which a monitoring system is configured to display visuals so that a user can view a health indication for a platform and localize a problem to one or more metrics and/or attributes being monitored.

FIG. 2B is a diagram that illustrates a radar-based visual and a tree map visual that can be displayed on a user interface, and how the radar-based visual and the tree map visual can be updated based on a problem that is localized to a specific attribute.

DETAILED DESCRIPTION

Figure 2A:
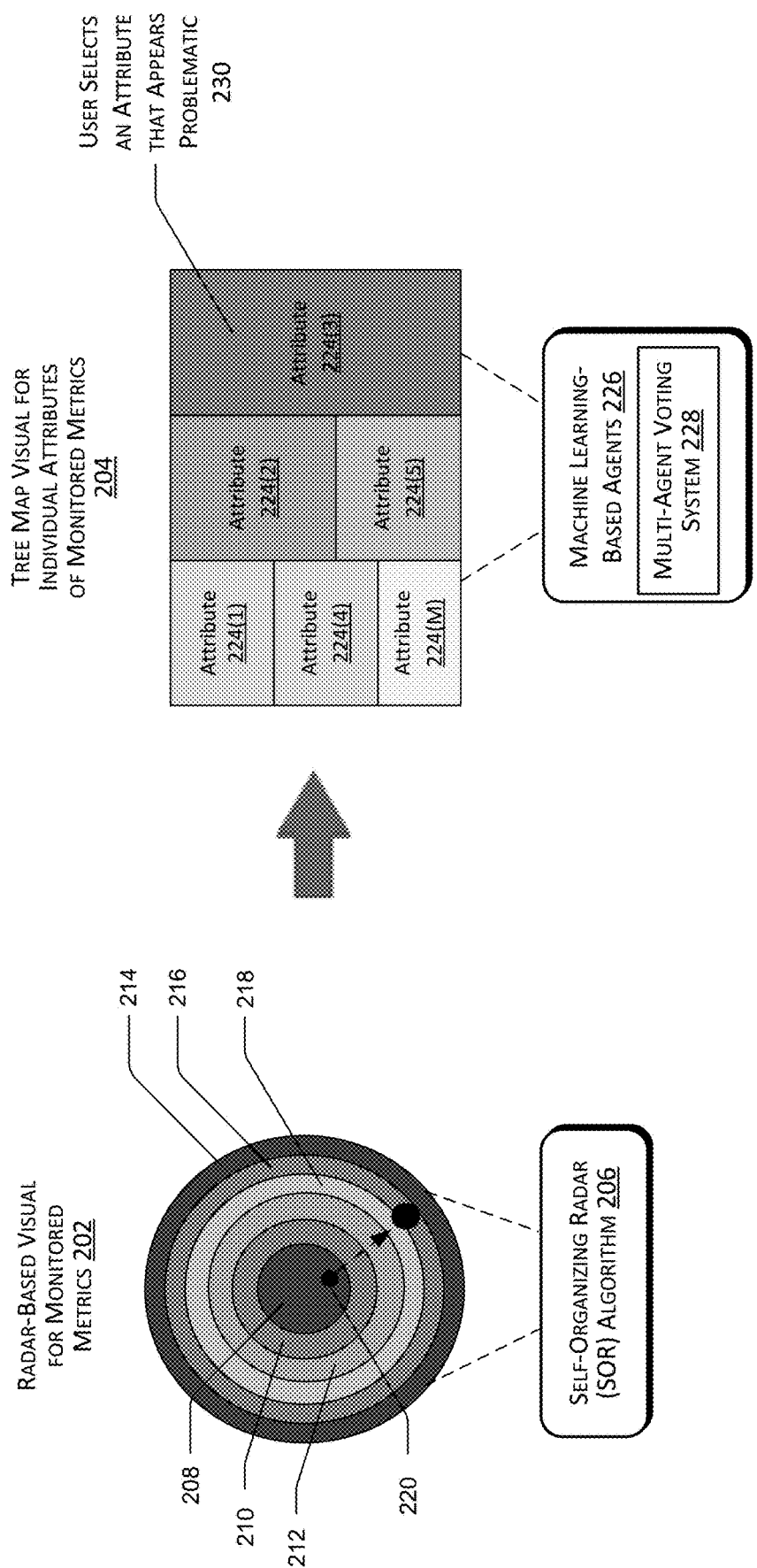
FIG. 2A is a diagram that illustrates a radar-based visual and a tree map visual that can be displayed on a user interface, and how the radar-based visual and the tree map visual can be used to localize a problem with a platform to a specific metric and/or a specific attribute being monitored.

The following Detailed Description presents technologies for generating visuals which are useable to indicate a problem associated with the health of a platform and to enable a user to identify a specific metric and/or a specific attribute with which the problem is associated. The disclosed technologies can enhance the functionality and efficiency of various machine learning systems and related applications.

FIG. 1 is a diagram illustrating an example environment 100 in which a monitoring system 102 is configured to display visuals so that a user 104 can view a health indication for a platform 106 and localize a problem to one or more metrics and/or attributes being monitored. In one configuration, the monitoring system 102 can be part of the platform 106. Alternatively, the monitoring system 102 can be a separate system that can be called upon by the platform 106 to implement the monitoring described herein.

In one example, the platform 106 can include resources (e.g., processing resources, networking resources, storage resources, etc.) that support a website, such as an electronic commerce site. Moreover, the user 104 may be part of a Site Reliability Engineering team tasked with monitoring hundreds or thousands of metrics 108, in real-time, in order to triage potential problems associated with the platform 106 and/or take appropriate remedial actions. The metrics 108 being monitored may relate to a particular function or process supported by the platform 106, such as the ability for customers to purchase items via an electronic commerce site.

While some of the examples described herein relate to health monitoring of a website such as an electronic commerce site, the techniques can additionally or alternatively be applied to other examples in which other metrics and/or other platforms are being monitored. For instance, the techniques described herein can be used to: display visuals representing active listings and market status for a seller of items (e.g., the user 104 in FIG. 1 can be a person that lists items on an electronic commerce site), to display visuals representing the segmentation of search results, or to display visuals representing a post-processing layer on top of a variety of possible artificial intelligence (AI) outputs.

FIG. 1 illustrates various devices 110(1)-110(N) (may be referred to herein as devices 110) that may interact with the platform 106 to implement the particular function or process supported by the platform 106 (where N in the context of FIG. 1 is a positive integer number that can be hundreds, thousands, hundreds of thousands, etc.). The devices 110 are each configured to generate and send data associated with the monitored metrics 112(1)-112(N) to the platform 106 and/or the monitoring system 102. Accordingly, FIG. 1 illustrates that the devices 110 generate and send the data associated with the monitored metrics 112(1)-112(N) (may be referred to herein as data 112) over one or more network(s) 114, and the data 112 is received by the monitoring system 102.

In various examples, the metrics 108 being monitored may belong to a category of metrics, such as checking out from an electronic commerce site (e.g., "checkout"). Accordingly, the category of metrics can be divided into multiple sub-category metrics (e.g., "checkouts_completed" and "checkouts_cancelled"). Moreover, a metric may include varying attributes. To this end, FIG. 1 illustrates that the data 112 provided by the devices 110 can include attributes 116(1)-116(N) (may be referred to herein as data 116). The attributes 116 may relate to a location in which a customer is purchasing an item from a website, a type of device being used to purchase the item, a payment method being used to pay for the item, and so forth.

More specifically, the metrics 108 being monitored may be based on customers checking out and buying items in different countries, such as the United States of America, Great Britain, Australia, France, Russia, South Africa, Brazil, etc. The metrics 108 being monitored may be based on customers checking out and buying items using different types of devices, such as IPHONE devices, ANDROID devices, and/or other types of devices. The metrics 108 being monitored may be based on customers checking out, buying items, and paying for the items using different payment methods, such as PAYPAL, a credit card, and/or other types of payment methods. An individual metric 108 can include one or multiple attributes 116, and one varying attribute 116 may result in a different metric 108 being monitored. For example, the following are different "checkout" metrics that may be monitored:

- an "checkouts_completed_overall" metric (e.g., all checkouts implemented using the platform regardless of location, device, and payment method),
- a "checkouts_completed_USA_IPHONE_PAYPAL" metric,
- a "checkouts_completed_AUSTRALIA_IPHONE_PAYPAL" metric,
- a "checkouts_completed_USA_ANDROID_PAYPAL" metric,
- a "checkouts_completed_USA_IPHONE_creditcard" metric.

The monitoring system 102 can comprise device(s) (e.g., servers) and/or other components that communicate with one another, with the platform 106, and/or with the devices 110 via one or more network(s) 114. Moreover, the monitoring system 102 can include a self-organizing radar (SOR) module 118 and a voting module 120. The number of illustrated modules is just an example, and the number can vary higher or lower. That is, functionality described herein in association with the illustrated modules can be performed by a fewer number of modules or a larger number of modules on one device or spread across multiple devices.

Using the data 112 associated with the metrics 108 being monitored, the self-organizing radar (SOR) module 118 can be used to generate and display a first, radar-based visual 122 to provide a high-level indication of whether the platform 106 is healthy. A platform 106 may be healthy when the data values associated with the metrics 108 are not deviating from expected or predicted data values in a meaningful manner. The first, radar-based visual 122 can be updated in real-time as the data 112 associated with the metrics 108 continues to be received by the monitoring system 102 over time.

Using the data 112 associated with the metrics 108 being monitored, the voting module 120 can optionally be used to generate and display a second, detailed display, such as a tree map visual 124. The second, tree map visual 124 enables the user 104 to localize a problem to a smaller group of metrics 108 being monitored. Stated another way, the second, tree map visual 124 allows a user to determine which metrics, out of hundreds or thousands of metrics being monitored, are experiencing anomalous activity. As further described herein, the second, tree map visual 124 can be generated using a machine learning model built based on historical data values for the metrics 126. It is to be appreciated that the second visual 124 may be any other visual capable of displaying metrics, such as a detailed grid view, or other graphic.

By generating and displaying the two visuals 122 and 124, the monitoring system 102 provides a real-time, interactive application where the user 104 can initially notice a problem using the first, radar-based visual 120, and then the user 104 can shift his or her focus to the second, tree map visual 124 to obtain a better understanding of the source of the problem. This is further described herein with respect to FIGS. 2A-2B.

Network(s) 114 can include, for example, public networks such as the Internet, private networks such as an institutional and/or personal intranet, or some combination of private and public networks. Network(s) 114 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 114 can utilize communications protocols, including packet-based and/or datagram-based protocols such as internet protocol (IP), transmission control protocol (TCP), user datagram protocol (UDP), or other types of protocols. Moreover, network(s) 114 can also include a number of devices that facilitate network communications and/or form a hardware basis for the networks, such as switches, routers, gateways, access points, firewalls, base stations, repeaters, backbone devices, and the like.

In various examples, device(s) of the monitoring system 102 can include one or more computing devices that operate in a cluster or other grouped configuration to share resources, balance load, increase performance, provide failover support or redundancy, or for other purposes. For instance, device(s) of the monitoring system 102 can belong to a variety of classes of devices such as traditional server-type devices.

A device 110 can belong to a variety of classes of devices, such as server-type devices, desktop computer-type devices, mobile-type devices, special purpose-type devices, embedded-type devices, and/or wearable-type devices. Thus, a device 110 can include, but is not limited to, a desktop computer, a game console and/or a gaming device, a tablet computer, a personal data assistant (PDA), a mobile phone/tablet hybrid, a laptop computer, a telecommunication device, a wearable device, a virtual reality (VR) device, an augmented reality (AR) device, an automotive computer, a network-enabled television, a terminal, an Internet of Things (IoT) device, a work station, a media player, a personal video recorders (PVR), a set-top box, or any other sort of computing device.

FIG. 2A is a diagram that illustrates a radar-based visual 202 and a tree map visual 204, and how the radar-based visual 202 and the tree map visual 204 can be used to localize a problem to a specific metric being monitored.

The radar-based visual 202 is configured to plot objects based on the data 112 received in association with the metrics 108 being monitored. In one embodiment, the radar-based visual 202 can be generated using an unsupervised artificial neural network algorithm that projects high-dimensional data onto a two-dimensional map. In one configuration, the radar-based visual 202 can be generated using a modified version of the "self-organizing map" (SOM) algorithm (i.e., "Kohonen's network"). The SOM algorithm achieves low-dimensional views of high-dimensional data. For example, high-dimensional data can be mapped into a two-dimensional data matrix using the algorithm and then the two-dimensional data matrix can be visualized as a heatmap, table, or other visualization. The modified version of the SOM algorithm accounts for time-series data and alters the output representation so that a symmetric radar-based visual is displayed, and thus, may be referred to as a "self-organizing radar" (SOR) algorithm 206.

In some implementations, the SOR algorithm 206 is adjusted to accommodate time-based expectations for the monitored metrics. Stated another way, separate SOR algorithms 206 can be used for different predetermined time periods. For instance, the SOR algorithm 206 can include adjustments for each hour of each day of a particular week in a year. This accounts for daily and/or seasonal expectations. In further implementations, the SOR algorithm 206 can be updated over time to reflect trends in the metrics being monitored.

The radar-based visual 202 can include different color and/or shaded regions to help signal a problem. For example, the inner part of the radar-based visual 202 around a center point can include regions 208, 210, 212 represented by different shades of a color, such as blue. Region 208 may be a darker shade of blue, which indicates a strong signal of normal activity, while region 212 may be a lighter shade of blue indicating a weaker signal of normal activity. Region 210 may be a shade of blue between the darker shade and the lighter shade.

The outer part of the radar-based visual 202 can include regions 214, 216, 218 represented by different shades of another color, such as red. Region 214 may be a darker shade of red, which indicates a strong signal of anomalous activity, while region 218 may be a lighter shade of red indicating a weaker signal of anomalous activity. Region 216 may be a shade of red between the darker shade and the lighter shade.

An object 220 (e.g., a dot) plotted on the radar-based visual 202 can represent a combination of metrics related to an aspect of the platform 106 being monitored. For instance, the combination of metrics may relate to a "checkouts_completed" category or sub-category, and the individual metrics in the combination may have varying attributes (e.g., different locations, different devices, different payment methods). The way in which the radar-based visual 202 is configured for display enables the object 220 to signal anomalous activity associated with the combination of metrics as the plotted location of the object moves toward the periphery of the radar-based visual 202 over time. For example, if the object 220 moves from the shown location in region 208, to the location in region 216, then this movement signals growing anomalous activity within the combination of metrics. In contrast, if the plotted location of the object 220 remains towards the center of the radar-based visual 202 (within region 208), then the plotted location of the object 220 signals normal activity associated with the combination of metrics. It is to be appreciated that the radar-based visual 202 may display more than one object concurrently.

In some embodiments, a size of the object (e.g., the size of a dot) can increase as the object moves through regions near the center of the radar-based visual 202 towards regions near the periphery of the radar-based visual 202. This is illustrated by the size of the object 220 when it is located in region 208 compared to the size of the object after it has moved to region 216. The size dimension of an object may help determine whether anomalous activity is due to a potentially normal but less frequent event, such as a peak demand period, promotion, or holiday, or may be due to activity that has not been observed before. In other words, the size of an object may indicate how elevated or different the object is from a specific region on the radar-based visual. An elevated object may mean that the radar has rarely or never seen such behavior when it was being trained.

Therefore, a size of the object 220 can represent a degree to which the real-time data for the combination of metrics is anomalous to the observed historic data. It is possible that that the object may be located near the center of the radar-based visual, yet one or more of the real-time metric values is foreign and is not commonly seen in the historical data. In a specific example, a large number of metrics being monitored may have normal values that closely match historical observations, but a small number of metrics (e.g., one, two, three, etc.) being monitored may have real-time values that are not commonly observed or that have never been observed before (e.g., foreign values). In this situation, the increased size of the object can be used to signal the anomaly because the location of the object is likely to be plotted towards the center of the radar-based visual due to the normal observations of the larger number of metrics.

A user can notice when the object starts to move from the blue regions 208, 210, 212 near the center of the radar-based visual 202 towards the red regions 214, 216, 218 near the periphery of the radar-based visual 202. Consequently, the movement, or lack thereof, provides an indication of the health of the platform 106. It is understood, in the context of this disclosure, that the radar-based visual 202 can be segmented to display multiple different objects representing different combinations of metrics simultaneously. Alternatively, the radar-based visual 202 can display objects generated at different time frames on segments associated with these time-frames. Furthermore, the radar-based visual 202 can be segmented to show and compare or contrast different domains on the same radar, such as the business-aspect domain on one half of the visual compared to the infrastructure domain on the second half, or the health of one data-center in contrast with the health of another data-center.

The tree map visual 204 includes a plurality of sections, and each section in the tree map visual 204 can be associated with a specific attribute 224(1)-224(M) used to compose one or more of the metrics being monitored (where M in the context of FIG. 2A is a positive integer number that can be hundreds, thousands, etc.). A size and/or a color of an individual section can be used to indicate anomalous activity for the specific attribute 224(1)-224(M). That is, as an amount of anomalous activity grows, a size of a section will increase and the color may change (e.g., from green to yellow to red).

As described above, a specific attribute 224(1)-224(M) may be a location of multiple different locations from which customers can purchase an item via an electronic commerce site and supporting platform (e.g., the United States of America, Great Britain, Australia, France, Russia, South Africa, Brazil, etc.), a type of device of multiple different types of devices that can be used by customers to purchase an item via the electronic commerce site and supporting platform (e.g., IPHONE, ANDROID, etc.), a payment method of multiple different payments methods that customers can use to purchase an item via the electronic commerce site and supporting platform (e.g., PAYPAL, credit card, etc.), and so forth.

The tree map visual 204 can be generated using machine learning-based agents 226 (e.g., hundreds of agents, thousands of agents, etc.) that constitute a multi-agent voting system 228. In one embodiment, a machine learning-based agent 226 can include a polynomial regression model coupled with a Quantile Loss Gradient Boosted Trees (QLGBT) machine learning model. The monitoring system 102 is configured to analyze the metrics being monitored and determine which metrics are highly correlated to distribute amongst the agents 226. The monitoring system 102 may ultimately determine hundreds or thousands of correlations between the metrics being monitored. For instance, independent regressors can be used to determine that a first metric and a second metric satisfy a correlation threshold, and therefore are highly correlated. If a first metric and a second metric are highly correlated, the assigned agent can confidently predict a data value for the second metric from the first metric. In a more specific example, an analysis of the historic data values 126 may yield a correlation in which a data value for a "checkouts_completed" metric can be used to predict a data value for a "checkouts_cancelled" metric. In another specific example, a historic analysis of data values can be used to identify a correlation in which a data value for a "checkouts_completed_France" metric can be used to predict a data value for a "checkouts_completed_overall" metric.

Given two highly correlated metrics, an agent 226 generates a prediction model so that a data value of a first metric can predict a data value for a second metric. A prediction model can be generated for each set of highly correlated metrics by multiple different agents. Provided an actual data value for a particular metric, an agent is configured to compare the actual data value to the data values predicted by the agent's prediction model generated in association with the particular metric. The agent then uses its own prediction error and/or other exogenous factors, such as temporal factors, holiday factors, etc., to generate upper and lower quantile limits (i.e., bounds) on the error using QLGBT. Other mechanisms, such as a Quantile Loss Deep Neural Network (QL-DNN), can be used to generate the upper and lower bounds as well. If the error in a predicted data value falls outside a confidence interval when compared to the actual data value, then the agent provides a vote that signals an anomaly. In other words, a vote by an agent means that an error in predicting a data value for a metric was outside an acceptable error range. In various examples, the error is a normalized error (e.g., a percentage) that is agnostic to the scale of the data. In other examples, the error may be an absolute error.

The vote is associated with a particular metric based on whether the error falls outside the upper bound or the lower bound. For example, a first correlated metric may be associated with the upper bound and a second correlated metric may be associated with the lower bound. The agent may use this approach when an anomaly is associated with a decrease in values (e.g., a dip). If the error in predicting the data value is outside the upper bound, the first correlated metric receives the vote and is therefore the voted metric. If the error in predicting the data value is outside the lower bound, the second correlated metric receives the vote and is therefore the voted metric. In another example, the first correlated metric may be associated with the lower bound and the second correlated metric may be associated with the upper bound. The agent may use this approach when an anomaly is associated with an increase in values (e.g., a spike).

Once the votes are received, the voting module 120 can analyze the agents assigned to the voted metric, and localize a problem to a specific attribute. For instance, the voting module 120 can examine the agents 226 to determine a total number of agents that share an attribute (e.g., a location such as the United States of America) with the voted metric, without regard to whether the agent voted or not. The voting module 120 also determines a number of voting agents that share the same attribute (e.g., a location such as the United States of America).

If a percentage determined based on the number of the voting agents that share the attribute and the total number of agents that share the same attribute is greater than a predetermined threshold percentage (e.g., a percentage between seventy and ninety percent), then the system can determine that the problem is likely localized to that attribute. In a specific example, a threshold can be set to seventy-five percent, and thus, if eighty out of a total of one hundred agents that use a metric related to the United States of America attribute provide a vote signaling an anomaly, then the system can localize a problem to a specific location, i.e., the United States of America.

Further, the voting module 120 can use this information in the tree map visual 204 to show a user that there may be a problem with respect to a particular attribute, such as the United States of America. For example, a size of a section can increase and/or a color of the section can change based on the percentage determined based on the number of the voting agents that share the attribute and the total number of agents that share the attribute and/or based on whether the percentage exceeds the predetermined threshold percentage.

In the example of FIG. 2A, the section representing attribute 224(3) has an increased size and/or a different color, and thus, attribute 224(3) is likely associated with anomalous activity. Accordingly, the user may select attribute 224(3) in order to better understand the problem, as referenced by 230.

Based on the user selection, both the radar-based visual and the tree map visual can be updated and/or rebuilt using data associated with the metrics that include attribute 224(3), as referenced by 232 and 234 in FIG. 2B. For example, if attribute 224(3) relates to the United States of America, then the radar-based visual is re-generated by the self-organizing radar (SOR) algorithm 206 using metrics that include the United States of America as an attribute. Moreover, the tree map visual is updated to display sections representing the metrics 236(1)-236(L) (where L in the context of FIG. 2B is a positive integer number) that include the United States of America as an attribute. In this way, the user can dig deeper to see where a problem is located (e.g., with regard to metric 236(2) and/or 236(3)).

In some examples, the object on the radar-based visual will not change locations when the radar-based visual is updated, but rather the background colored regions are redistributed. However, in other examples, the background colored regions can remain static and the object can change locations (e.g., the object is replotted).

Figure 3:
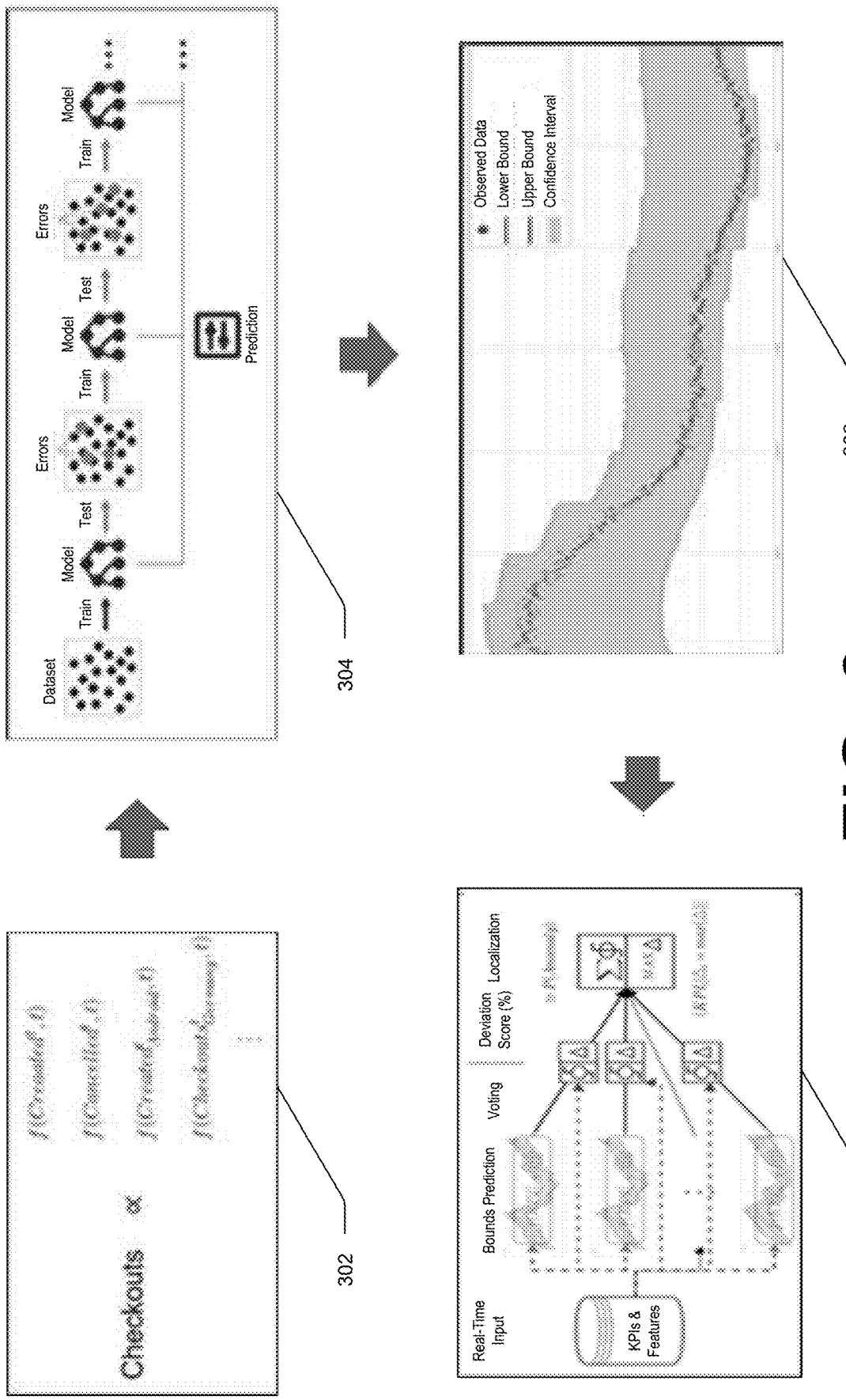
FIG. 3 illustrates an example of how the Quantile Loss Gradient Boosted Trees (QLGBT) model-based multi-agent system can be used to produce information to be represented via the tree map visual.

FIG. 3 illustrates the use of the Quantile Loss Gradient Boosted Trees (QLGBT) model-based multi-agent system that can be used to generate a tree map visual. For each category of metric (e.g., checkouts), a set of highly correlated metrics as independent regressors is determined. For each correlated pair of metrics, a time-independent generalized linear model (GLM) with polynomial relationships is fitted, as referenced by 302. Models other than a generalized linear model can be used as well.

Using the regression error as a target along with temporal and exogenous variables, two gradient boosted tree (GBT) models are fitted around the prediction error, an example of which is referenced by 304. One gradient boosted tree (GBT) model can correspond to an upper bound and another gradient boosted tree (GBT) model can correspond to a lower bound.

Using the gradient of a quantile loss/objective function in the boosting process, intervals on the predicted error are obtained. The end result is a pipeline that provides thresholds on the error, which is calculated from the predicted data value for the metric compared to the actual data value for the metric, as referenced by 306. This process may be referred to as Dynamic Error Thresholding. This result is obtained for a large number (e.g., hundreds) of models utilizing correlated pairs of metrics.

A single agent can be the embodiment of a correlated pair of metrics, the attributes of the metrics, the polynomial regression model(s), and the corresponding QLGBT models (or QL-DNN models) which drives the agent's decision. The agent's decision objective is whether to vote and which metric from the pair of metrics to vote for as being anomalous.

Votes are then collected from the agents. When an agent votes, it means that the error in predicting a data value for a metric was outside a permissible error range. As referenced by 308, the problem can be localized by comparing a number of voting agents that share an attribute to a total number of agents that share the attribute. The comparison yields a percentage, and as the percentage increases, a likelihood that a problem is localized to the attribute also increases.

Figure 4:
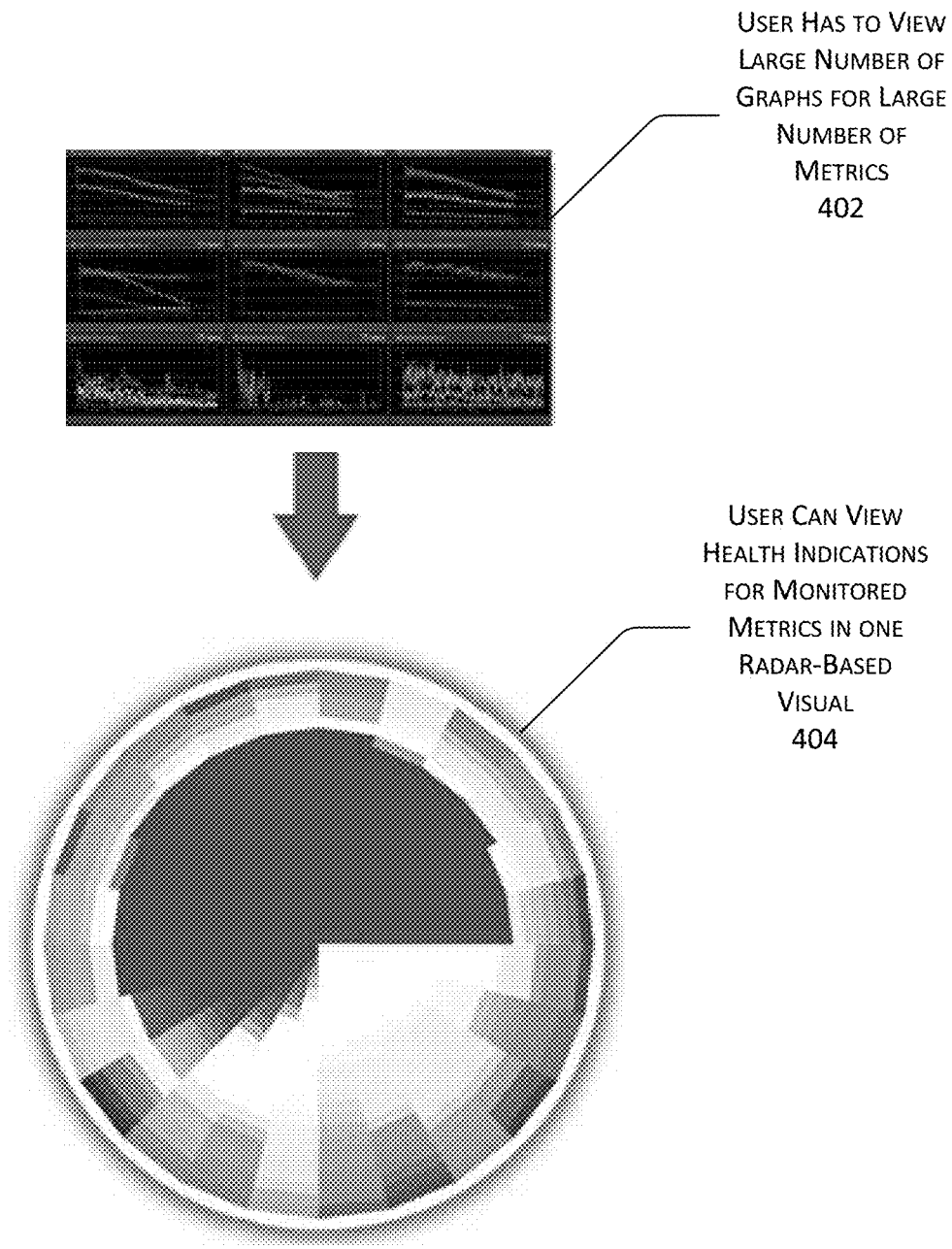
FIG. 4 is a diagram that illustrates an example of how a user can use the radar-based visual to view information associated with monitored metrics rather than a large number of charts, where each chart is associated with an individual metric.

FIG. 4 is a diagram that illustrates an example of how a user can use the radar-based visual to view information associated with monitored metrics rather than a large number of charts, where each chart is associated with an individual metric. Reference 402 shows that a user, such as a Site Reliability Engineer, typically has to view a user interface with a large number of charts. Each chart represents a single metric being monitored, and thus, a user responsible for monitoring a large number of metrics (e.g., hundreds) finds herself or himself switching between charts and/or different screens when attempting to identify a problem.

Reference 404 illustrates a more effective data visualization approach, in the form of a radar-based visual, that can showcase a large number (e.g., hundreds) of metrics at once. The radar-based visual is able to tell a viewer whether or not a problem is happening within some collection of metrics by plotting objects, where the location of an object provides an indication of the health of the platform being monitored.

Figure 5:
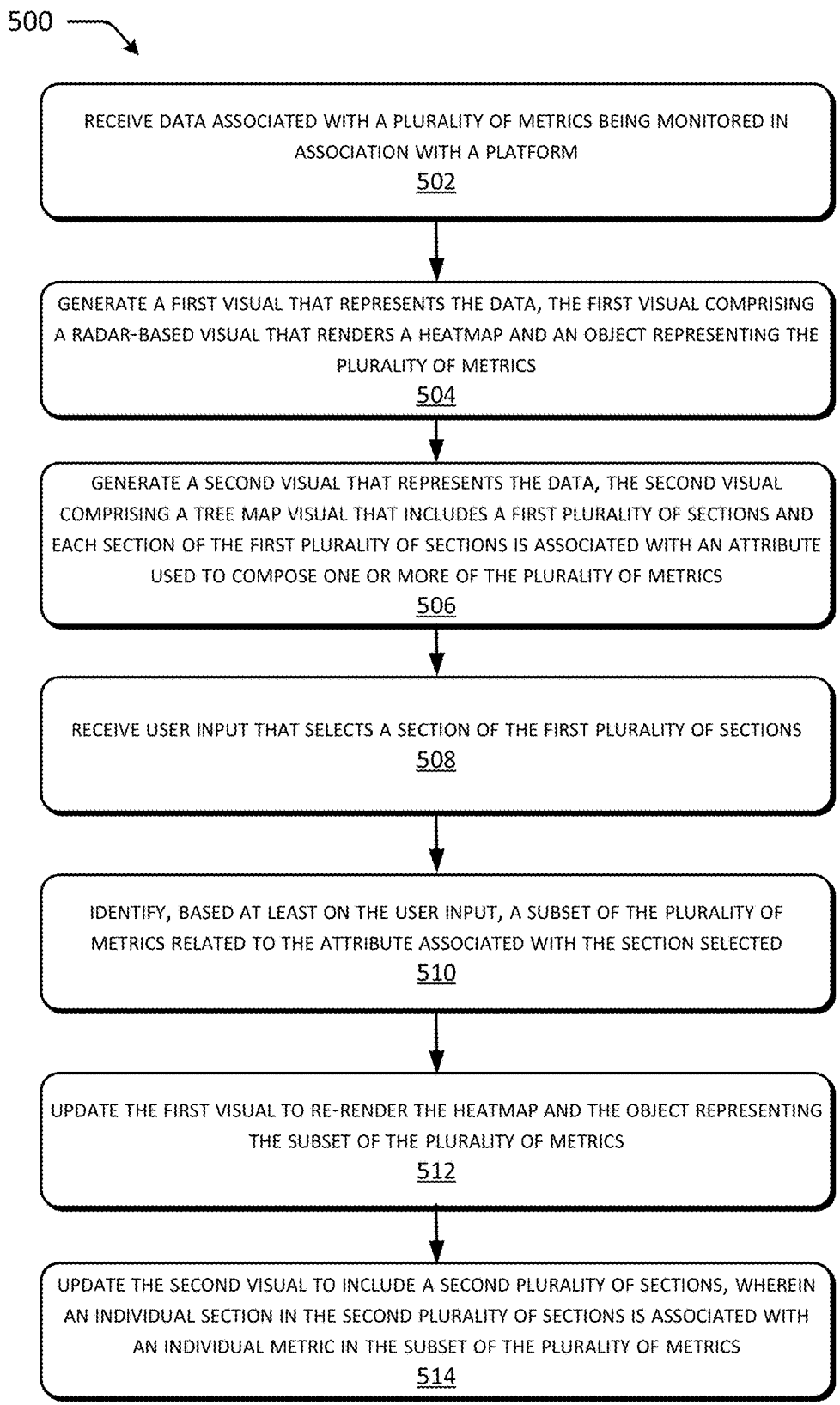
FIG. 5 is a flow diagram showing aspects of an illustrative method, according to one embodiment disclosed herein.
Figure 6A:
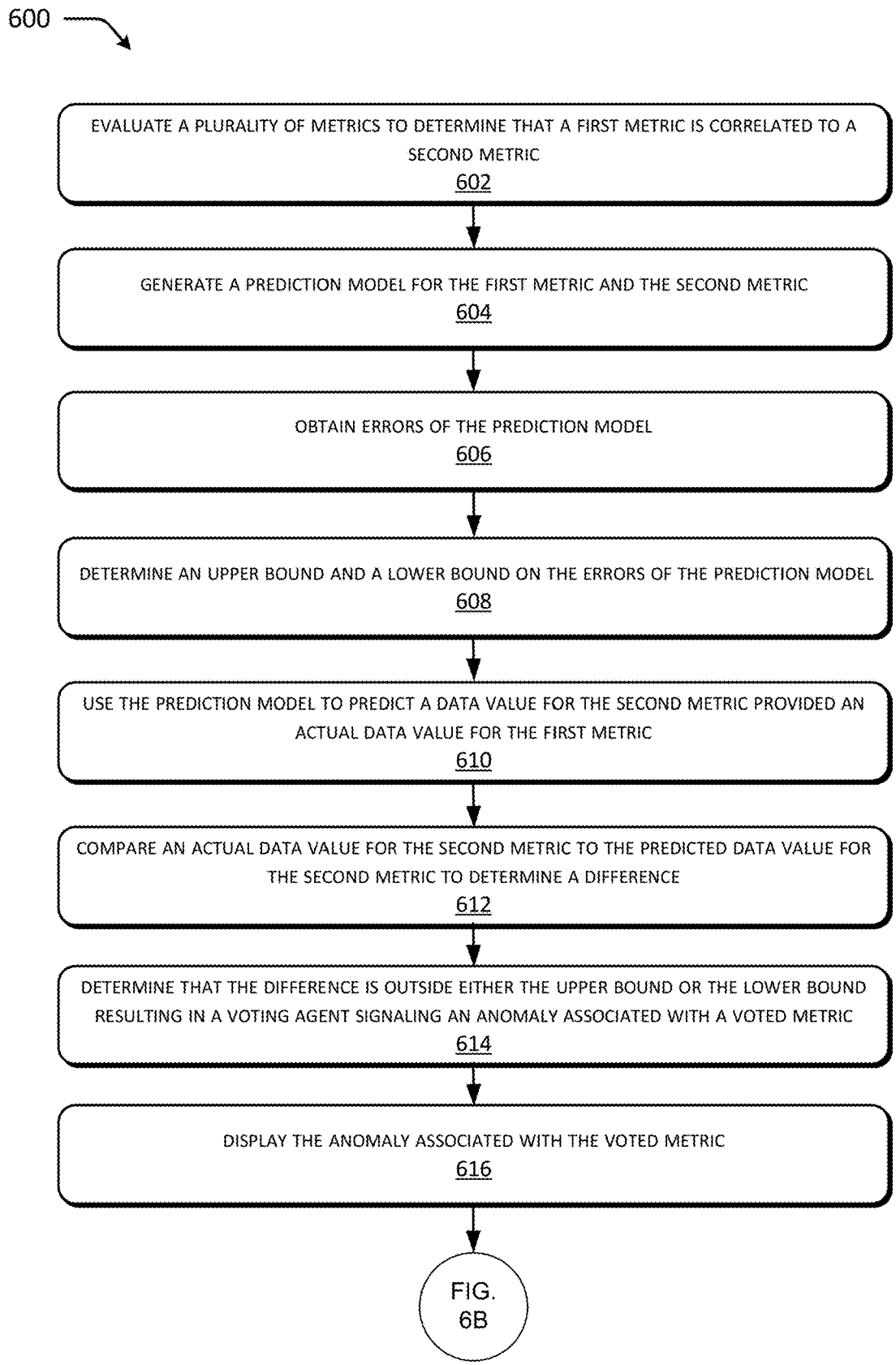
FIGS. 6A-6B include a flow diagram showing aspects of an illustrative method, according to one embodiment disclosed herein.
Figure 6B:
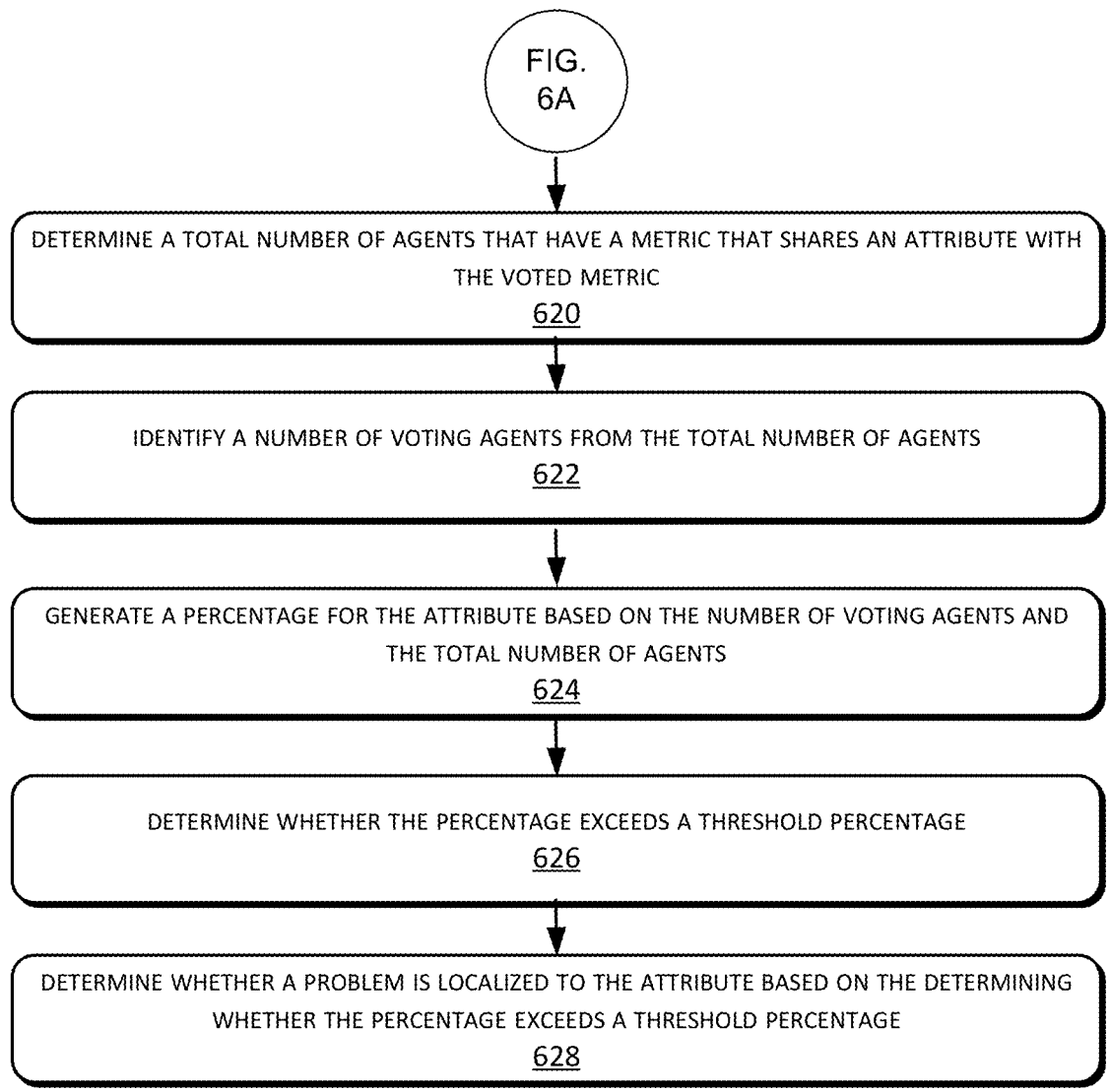

FIGS. 5 and 6A-6B are diagrams illustrating aspects of methods 500 and 600 for implementing some of the techniques disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-readable storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example methods described below are operating on a computing device, it can be appreciated that these methods can be performed on any computing system which may include a number of computing devices (e.g., servers) working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

The method 500 begins at operation 502, which illustrates receiving data associated with a plurality of metrics being monitored in association with a platform. For example, the metrics being monitored may relate to a particular function or process of the platform, such as the ability for customers to purchase items via an electronic commerce site. In a more specific example, the metrics being monitored may relate to one or more of a customer being able to sign in, a customer being able to check out, and so forth.

Operation 504 illustrates generating a first visual that represents the data. As described above, the first visual can include a radar-based visual that renders a heatmap and an object representing the plurality of metrics. The radar-based visual can provide a high-level indication of whether the platform is healthy based on the plurality of metrics. That is, movement of the object within the radar-based visual can signal normal activity or abnormal activity with respect to the plurality of metrics. Additionally or alternatively, a size of the object can signal normal activity or abnormal activity with respect to the plurality of metrics.

Operation 506 illustrates generating a second visual that represents the data. The second visual can include a tree map visual that includes a first plurality of sections and each section of the first plurality of sections is associated with an attribute used to compose one or more of the plurality of metrics. As described in examples above, an attribute can relate to a location, a type of device, a type of payment method, and so forth.

Operation 508 illustrates receiving user input that selects a section of the first plurality of sections. The user input may be provided in order to help a user attempt to localize a potential problem to a particular metric and/or a particular attribute.

Operation 510 illustrates identifying, based at least on the user input, a subset of the plurality of metrics related to the attribute associated with the section selected.

Operation 512 illustrates updating the first visual to re-render the heatmap and the object representing the subset of the plurality of metrics. This updated first visual can provide the user with a high-level indication of whether the platform is experiencing anomalous activity with respect to the subset of the plurality of metrics.

Operation 514 illustrates updating the second visual to include a second plurality of sections. An individual section in the second plurality of sections is associated with an individual metric in the subset of the plurality of metrics.

Switching to FIGS. 6A-6B, the method 600 begins at operation 602, which illustrates evaluating a plurality of metrics to determine that a first metric is correlated to a second metric. Accordingly, this evaluation operation may yield a set of correlated metrics for a particular function or process the platform implements (e.g., checkouts).

Operation 604 illustrates generating a prediction model for the first metric and the second metric. Provided an actual data value for a first metric, the prediction model is configured to predict a data value for the second metric.

Operation 606 illustrates obtaining errors of the prediction model. In some examples, exogenous variables can be used to obtain the errors.

Operation 608 determines an upper bound and a lower bound on the errors of the prediction model. In one example, the upper bound and the lower bound are determined using Quantile-Loss Gradient Boosted Tree error threshold models. The upper bound may be associated with the first metric and the lower bound may be associated with the second metric. Alternatively, the upper bound may be associated with the second metric and the lower bound may be associated with the first metric.

Operation 610 illustrates using the prediction model to predict a data value for the second metric provided an actual data value for the first metric.

Operation 612 illustrates comparing an actual data value for the second metric to the predicted data value for the second metric to determine a difference.

Operation 614 illustrates determining that the difference is outside either the upper bound or the lower bound. When the difference is outside the upper bound, an agent associated with the prediction model provides a vote signaling an anomaly associated with the first metric or the second metric, whichever one is associated with the upper bound. That is, the agent is a voting agent and the metric for which an anomaly is signaled is a voted metric. When the difference is outside the lower bound, an agent associated with the prediction model provides a vote signaling an anomaly associated with the other one of the first metric or the second metric. That is, the agent is still the voting agent but the other metric for which the anomaly is signaled is the voted metric. In the example described above, an agent can provide three possible decision outputs: a vote for a first metric, a vote for a second metric, or a vote is not provided.

Operation 616 illustrates that the anomaly associated with the voted metric is displayed. For example, the vote signaling the anomaly can be used as a basis to generate the radar-based visual and/or the tree map visual.

The following operations in FIG. 6B can be used to determine whether a problem is likely localized to a particular attribute included in the voted metric and/or to alter the displayed visuals based on the determination.

Operation 620 illustrates determining a total number of agents that have a metric that shares a particular attribute with the voted metric.

Operation 622 illustrates identifying a number of voting agents, from the total number of agents, that provided a vote signaling anomalous activity.

Operation 624 illustrates generating a percentage for the particular attribute based on the number of voting agents and the total number of agents.

Operation 626 illustrates determining whether the percentage exceeds a threshold percentage (e.g., a percentage between seventy and ninety percent).

Operation 628 illustrates determining whether a problem is localized to the particular attribute based on the determining whether the percentage exceeds the threshold percentage. For instance, if the generated percentage meets or exceeds the threshold percentage, a problem is likely associated with the particular attribute. If the generated percentage is less than the threshold percentage, a problem is not likely associated with the particular attribute (e.g., the voting agent may have identified an outlier instance).

Operations 620 through 628 may be repeated for each of the attributes included in a voted metric, so that a problem can be localized to an attribute that is likely causing the problem.

Figure 7:
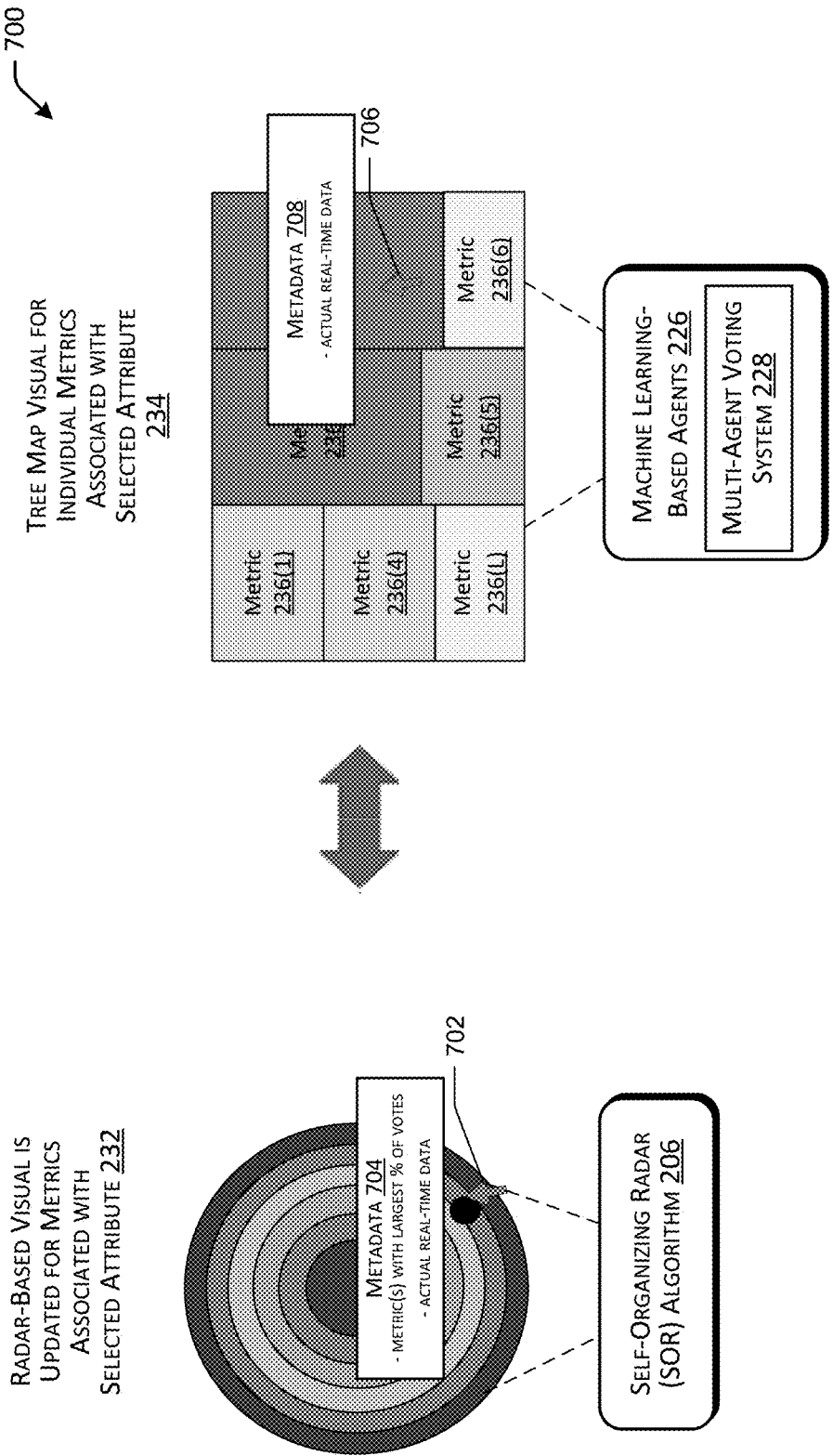
FIG. 7 is a diagram that illustrates a radar-based visual and a tree map visual that can be displayed on a user interface, and how user input (e.g., a hover input associated with the object on the radar-based visual and/or a section of the tree map visual) can be provided to view metadata.

FIG. 7 is a diagram 700 that illustrates a radar-based visual and a tree map visual that can be displayed on a user interface, and how user input (e.g., a hover input associated with the object on the radar-based visual and/or a section of the tree map visual) can be provided to view metadata. For ease of discussion, FIG. 7 reproduces the content described above with respect to FIG. 2B.

As shown, a user such as a Site Reliability Engineer can interact with the radar-based visual and/or the tree map visual to glean more information about the metrics and/or attributes being monitored. For instance, the interaction can include an input 702 that hovers over the object (e.g., the dot) plotted on the radar-based visual. Based on the input 702, metadata 704 that further describes the underlying data associated with the metrics represented by the object can be displayed. In one example, the metadata 704 can identify one or more metrics that include the largest percentage of votes from agents. Consequently, these metric(s) are likely ones contributing to a problem (e.g., a slow bleed anomaly) with the platform being monitored. In another example, the metadata 704 can reveal actual real-time data, using numbers and/or graphs, for these metrics that are likely contributing to the problem (e.g., eighty percent of IPHONE checkouts in France are being cancelled unexpectedly).

Similarly, additional user interaction can include an input 706 that hovers over a section 236(3) of the tree map visual. In this example, the section represents a specific metric, but in other examples the section can represent an attribute. Based on the input 706, metadata 708 that further describes the underlying data associated with the section can be displayed. Again, the metadata 708 can identify one or more metrics that include the largest percentage of votes from agents and/or the metadata 708 can reveal actual real-time data, using numbers and/or graphs, for the a metric or an attribute.

Figure 8A:
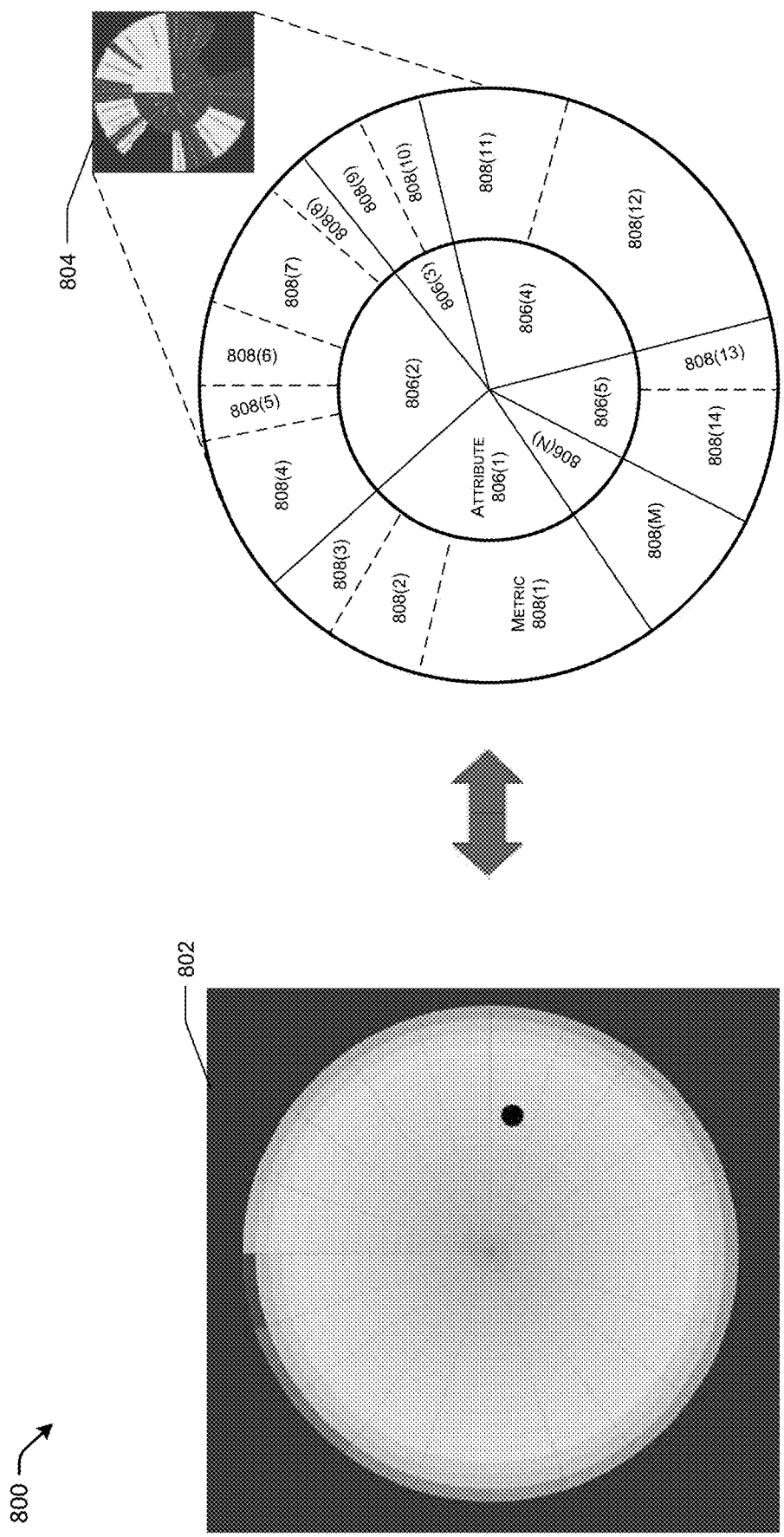
FIG. 8A is a diagram that illustrates a radar-based visual and alternative visual (e.g., a "sunburst" visual) that can be displayed on a user interface, and how the visuals can be used to localize a problem with a platform to a specific metric and/or a specific attribute being monitored.

FIG. 8A is a diagram 800 that illustrates a radar-based visual 802 and alternative visual 804 (e.g., a "sunburst" visual). The alternative visual 804 can display representations of the hierarchical data on a user interface instead of the tree map visual in FIG. 2A. The inside layer of alternative visual 804 includes the top level sections 806(1-N) (where N is a positive integer number that can be hundreds, thousands, etc.) that represent the individual attributes. As described above, the attributes can include specific countries or other locals, specific payment methods, specific devices, and so forth. The outside layer of the alternative visual 804 includes the low level sections 808(1-M) (where M is a positive integer number that can be hundreds, thousands, etc.) that represent the individual metrics being monitored. The sections 808(1-M) in the outer layer include the attribute in a section 806(1-N) of the inner layer to which they are graphically connected. For instance, the metrics represented by sections by 808(11) and 808(12) include the attribute represented by section 806(4).

As described above, a size and/or a color of an individual section in the alternative visual 804 can be used to indicate anomalous activity for a specific attribute and/or for a specific metric. That is, as an amount of anomalous activity grows, a size of a section will increase and/or the color may change. Consequently, the radar-based visual 802 and the alternative visual 804 can be used to localize a problem with a platform to a specific metric and/or a specific attribute being monitored. For example, the size of sections 806(4), 808(11), and/or 808(12) provides a visual indication that a problem is likely occurring with respect to the attribute represented by 806(4) and the problem may be specific to the metrics represented by sections 808(11) and 808(12).

In some examples, a user interface may include a toggle input so a user can switch between viewing a tree map visual, as described above, and the alternative visual 804 (e.g., "sunburst" visual) illustrated in FIG. 8A.

Figure 8B:
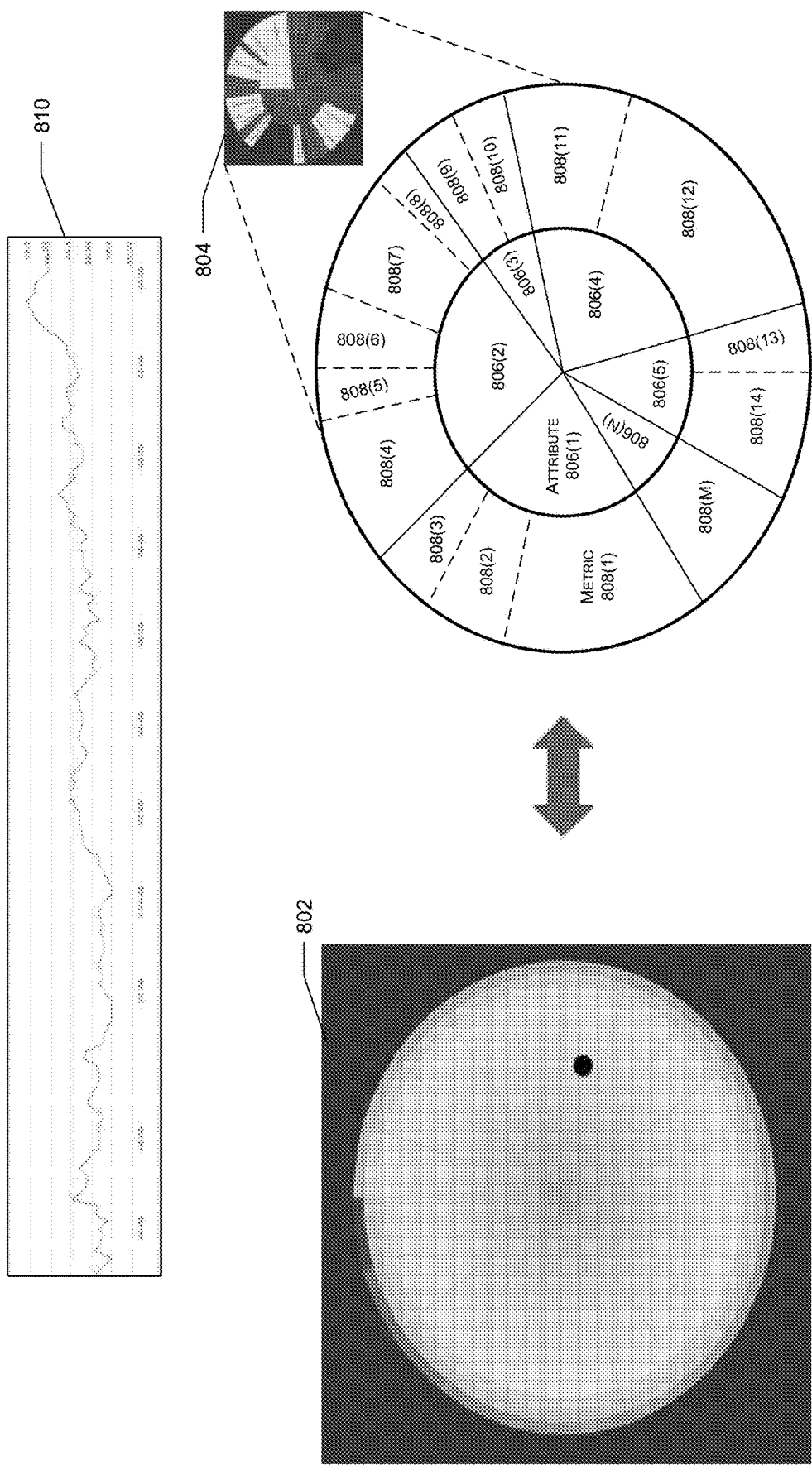
FIG. 8B is a diagram that illustrates the radar-based visual and the alternative visual of FIG. 8A, as well as a timeline visual that shows an incident score for a recent period of time.

FIG. 8B is a diagram that illustrates the radar-based visual and the alternative visual of FIG. 8A, as well as a timeline visual 810 that shows an incident score for a recent period of time. The timeline visual 810 may provide a good historic representation of an overall health of a platform during a handover period, when an on-duty Site Reliability Engineer is leaving and a new Site Reliability Engineer is arriving. Accordingly, the timeline visual 810 plots a line graph of an incident score over a recent period of time (e.g., the last twenty-four hours, the last twelve hours, the last six hours, etc.). The incident score reflects errors in the expected data for the metrics being monitored. Accordingly, if the incident score increase over a period of time (e.g., an hour), then a user viewing the timeline visual 810 can quickly see when a problem occurred, or is occurring.

Figure 9:
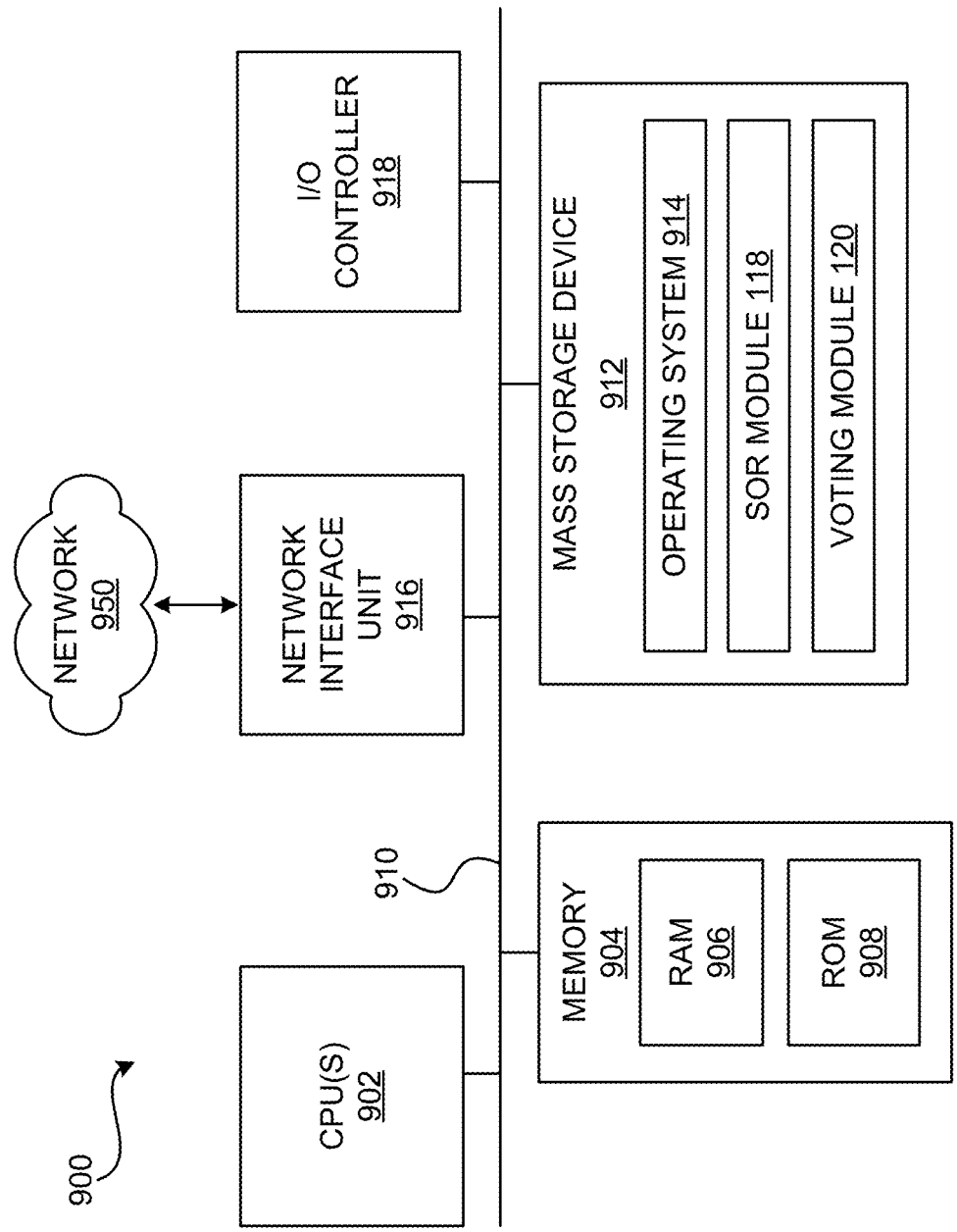
FIG. 9 is a computer architecture diagram illustrating aspects of an example computer architecture for a computer capable of executing the software components described herein.

FIG. 9 shows an example computer architecture for a computer capable of providing the functionality described herein such as, for example, a computing device configured to implement the functionality described above with reference to FIGS. 1-8B. Thus, the computer architecture 900 illustrated in FIG. 9 illustrates an architecture for a server computer or another type of computing device suitable for implementing the functionality described herein. The computer architecture 900 might be utilized to execute the various software components presented herein to implement the disclosed technologies.

The computer architecture 900 illustrated in FIG. 9 includes a central processing unit 902 ("CPU"), a system memory 904, including a random-access memory 906 ("RAM") and a read-only memory ("ROM") 908, and a system bus 910 that couples the memory 904 to the CPU 902. A firmware containing basic routines that help to transfer information between elements within the computer architecture 900, such as during startup, is stored in the ROM 908. The computer architecture 900 further includes a mass storage device 912 for storing an operating system 914, other data, and one or more executable programs including, for example, the SOR module 118 and/or the voting module 120.

The mass storage device 912 is connected to the CPU 902 through a mass storage controller (not shown) connected to the bus 910. The mass storage device 912 and its associated computer-readable media provide non-volatile storage for the computer architecture 900. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 900. For purposes of the claims, the phrase "computer storage medium," "computer-readable storage medium" and variations thereof, does not include waves, signals, and/or other transitory and/or intangible communication media, per se.

According to various implementations, the computer architecture 900 might operate in a networked environment using logical connections to remote computers through a network 950. A computing device implementing the computer architecture 900 might connect to the network 950 through a network interface unit 916 connected to the bus 910. It should be appreciated that the network interface unit 916 might also be utilized to connect to other types of networks and remote computer systems.

The computer architecture 900 might also include an input/output controller 918 for receiving and processing input from a number of other devices, including a keyboard, mouse, or electronic stylus. Similarly, the input/output controller 918 might provide output to a display screen, a printer, or other type of output device.

It should be appreciated that the software components described herein might, when loaded into the CPU 902 and executed, transform the CPU 902 and the overall computer architecture 900 from a general-purpose computing system into a special-purpose computing system customized to facilitate the functionality presented herein. The CPU 902 might be constructed from any number of transistors or other discrete circuit elements, which might individually or collectively assume any number of states. More specifically, the CPU 902 might operate as a finite-state machine, in response to executable instructions contained within the software modules disclosed herein. These computer-executable instructions might transform the CPU 902 by specifying how the CPU 902 transitions between states, thereby transforming the transistors or other discrete hardware elements constituting the CPU 902.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 900 in order to store and execute the software components presented herein. It also should be appreciated that the computer architecture 900 might include other types of computing devices, including hand-held computers, embedded computer systems, personal digital assistants, and other types of computing devices known to those skilled in the art.

It is also contemplated that the computer architecture 900 might not include all of the components shown in FIG. 9, might include other components that are not explicitly shown in FIG. 9, or might utilize an architecture completely different than that shown in FIG. 9. For example, and without limitation, the technologies disclosed herein can be utilized with multiple CPUs for improved performance through parallelization, graphics processing units ("GPUs") for faster computation, and/or tensor processing units ("TPUs"). The term "processor" as used herein encompasses CPUs, GPUs, TPUs, and other types of processors.

The disclosure presented herein also encompasses the subject matter set forth in the following clauses.

Example Clause A, a method comprising: receiving data associated with a plurality of metrics being monitored in association with a platform; generating, by one or more devices, a first visual that represents the data, the first visual comprising a radar-based visual that renders a heatmap and an object representing the plurality of metrics; generating a second visual that represents the data, the second visual comprising a tree map visual that includes a plurality of sections and each section of the plurality of sections is associated with an attribute used to compose one or more of the plurality of metrics; receiving user input that selects a section of the plurality of sections; identifying, based at least on the user input, a subset of the plurality of metrics related to the attribute associated with the selected section; and updating the first visual to re-render the heatmap and the object so the object represents the subset of the plurality of metrics.

Example Clause B, the method of Example Clause A, further comprising updating the second visual to include another plurality of sections, wherein an individual section in the other plurality of sections is associated with an individual metric in the subset of the plurality of metrics.

Example Clause C, the method of Example Clause A or Example Clause B, wherein a location of the object on the radar-based visual signals anomalous activity associated with the plurality of metrics as the location of the object moves from a centrally located region of the radar-based visual towards a peripherally located region of the radar-based visual over time.

Example Clause D, the method of Example Clause A or Example Clause B, wherein a location of the object on the radar-based visual signals normal activity associated with the plurality of metrics as the location of the object remains within a set of centrally located regions of the radar-based visual over time.

Example Clause E, the method of any one of Example Clauses A through D, wherein the first visual is generated using an unsupervised artificial neural network algorithm that projects high-dimensional data on to a two-dimensional map.

Example Clause F, the method of Example Clause E, wherein the unsupervised artificial neural network algorithm comprises a self-organizing map (SOM) algorithm that accounts for time-series data and alters an output representation so that a symmetric radar-based visual is displayed.

Example Clause G, the method of any one of Example Clauses A through F, wherein the second visual is generated using a multi-agent voting system of Quantile Loss Gradient Boosted Trees (QLGBT) machine learning model-based agents.

Example Clause H, the method of any one of Example Clauses A through G, wherein the attribute comprises one of: a specific location for at least some of the plurality of metrics being monitored; a type of device for at least some of the plurality of metrics being monitored; or a type of payment method for at least some of the plurality of metrics being monitored.

Example Clause I, the method of any one of Example Clauses A through H, wherein the object has a size and updating the first visual re-computes the size for the object.

Example Clause J, the method of any one of Example Clauses A through I, wherein the object remains at a same location on the first visual when the first visual is updated.

Example Clause K, the method of any one of Example Clauses A through J, wherein at least one of a size or a color of a section indicates an amount of anomalous activity for the attribute associated with the section.

Example Clause L, a system comprising: one or more processing units; and computer-readable storage media storing instructions that, when executed by the one or more processing units, cause the system to perform operations comprising: receiving data associated with a plurality of metrics being monitored in association with a platform; generating a first visual that represents the data, the first visual comprising a radar-based visual that renders an object representing the plurality of metrics; generating a second visual that represents the data, the second visual including a plurality of sections and each section of the plurality of sections is associated with an attribute used to compose one or more of the plurality of metrics; receiving user input that selects a section of the plurality of sections; identifying, based at least on the user input, a subset of the plurality of metrics related to the attribute associated with the selected section; and updating the first visual to re-render the object based on the subset of the plurality of metrics.

Example Clause M, the system of Example Clause L, wherein the operations further comprise updating the second visual to include another plurality of sections, wherein an individual section in the other plurality of sections is associated with an individual metric in the subset of the plurality of metrics.

Example Clause N, the system of Example Clause L or Example Clause M, wherein a location of the object on the radar-based visual signals anomalous activity associated with the plurality of metrics as the location of the object moves from a centrally located region of the radar-based visual towards a peripherally located region of the radar-based visual over time.

Example Clause O, the system of Example Clause L or Example Clause M, wherein a location of the object on the radar-based visual signals normal activity associated with the plurality of metrics as the location of the object remains within a set of centrally located regions of the radar-based visual over time.

Example Clause P, the system of any one of Example Clauses L through O, wherein the first visual is generated using an unsupervised artificial neural network algorithm that projects high-dimensional data on to a two-dimensional map.

Example Clause Q, the system of Example Clause P, wherein the unsupervised artificial neural network algorithm comprises a self-organizing map (SOM) algorithm that accounts for time-series data and alters an output representation so that a symmetric radar-based visual is displayed.

Example Clause R, the system of any one of Example Clauses L through Q, wherein the second visual is generated using a multi-agent voting system of Quantile Loss Gradient Boosted Trees (QLGBT) machine learning model-based agents.

Example Clause S, the system of any one of Example Clauses L through R, wherein the attribute comprises one of: a specific location for at least some of the plurality of metrics being monitored; a type of device for at least some of the plurality of metrics being monitored; or a type of payment method for at least some of the plurality of metrics being monitored.

Example Clause T, computer-readable storage media comprising instructions that, when executed by one or more processing units, cause a system to perform operations comprising: receiving data associated with a plurality of metrics being monitored in association with a platform; generating a first visual that represents the data, the first visual comprising a radar-based visual that renders an object representing the plurality of metrics; generating a second visual that represents the data, the second visual including a plurality of sections and each section of the plurality of sections is associated with an attribute used to compose one or more of the plurality of metrics; receiving user input that selects a section of the plurality of sections; identifying, based at least on the user input, a subset of the plurality of metrics related to the attribute associated with the selected section; and updating the radar-based visual to render the object based on the subset of the plurality of metrics.

The terms "a," "an," "the" and similar referents used in the context of describing the techniques (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different metrics, two different visuals, etc.).

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z,"

unless specifically stated otherwise, is to be understood to present that an element may be either X, Y, or Z, or a combination thereof.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method comprising:
   receiving data describing a plurality of metrics being monitored for a platform;
   generating a first visual that represents the data describing the plurality of metrics by:
   rendering a circular heatmap;
   rendering an object that represents a combination of the plurality of metrics;
   positioning the object relative to a center of the circular heatmap based on a comparison of each of the plurality of metrics to observed historic data for each of the plurality of metrics; and
   displaying the object with a size relative to the circular heatmap that indicates a degree to which real-time data for at least one of the plurality of metrics is anomalous to observed historic data for the at least one of the plurality of metrics;
   generating a second visual that represents the data;
   receiving user input in relation to the second visual; and
   updating the first visual to re-render the circular heatmap and the object based on the user input in relation to the second visual.

2. The method of claim 1, further comprising adjusting a location of the object relative to the circular heatmap from a centrally located region of the circular heatmap towards a peripherally located region of the circular heatmap in response to detecting anomalous activity associated with the plurality of metrics over time.

3. The method of claim 1, further comprising maintaining a location of the object relative to the circular heatmap at one or more centrally located regions of the circular heatmap in response to detecting normal activity associated with the plurality of metrics over time.

4. The method of claim 1, wherein one or more centrally located regions of the circular heatmap represent scenarios that are more frequently observed according to the observed historic data than a more peripherally located region of the circular heatmap.

5. The method of claim 1, wherein one or more peripherally located regions of the circular heatmap represent scenarios that are less frequently observed according to the observed historic data than a more centrally located region of the circular heatmap.

6. The method of claim 1, wherein one or more centrally located regions of the circular heatmap are rendered in a first color that signals normal activity associated with the plurality of metrics and one or more peripherally located regions of the circular heatmap are rendered in a second color that signals anomalous activity associated with the plurality of metrics.

7. The method of claim 1, wherein displaying the object with a larger size represents that the real-time data for the at least one of the plurality of metrics is more anomalous than displaying the object with a smaller size.

8. The method of claim 1, wherein the first visual is generated using an unsupervised artificial neural network algorithm that projects high-dimensional data on to a two-dimensional map.

9. The method of claim 8, wherein the unsupervised artificial neural network algorithm comprises a self-organizing map (SOM) algorithm that accounts for time-series data and alters an output representation to produce the circular heatmap for rendering.

10. A system comprising:
    one or more processing units; and
    computer-readable storage media storing instructions that, when executed by the one or more processing units, cause the system to perform operations comprising:
    receiving data describing a plurality of metrics being monitored for a platform;
    generating a first visual that represents the data describing the plurality of metrics by:
    rendering a circular heatmap;
    rendering an object that represents a combination of the plurality of metrics;
    positioning the object relative to a center of the circular heatmap based on a comparison of each of the plurality of metrics to observed historic data for each of the plurality of metrics; and
    displaying the object with a size relative to the circular heatmap that indicates a degree to which real-time data for at least one of the plurality of metrics is anomalous to observed historic data for the at least one of the plurality of metrics;
    generating a second visual that represents the data;
    receiving user input in relation to the second visual; and
    updating the first visual to re-render the circular heatmap and the object based on the user input in relation to the second visual.

11. The system of claim 10, further comprising adjusting a location of the object relative to the circular heatmap from a centrally located region of the circular heatmap towards a peripherally located region of the circular heatmap in response to detecting anomalous activity associated with the plurality of metrics over time.

12. The system of claim 10, further comprising maintaining a location of the object relative to the circular heatmap at one or more centrally located regions of the circular heatmap in response to detecting normal activity associated with the plurality of metrics over time.

13. The system of claim 10, wherein one or more centrally located regions of the circular heatmap represent scenarios that are more frequently observed according to the observed historic data than a more peripherally located region of the circular heatmap.

14. The system of claim 10, wherein one or more peripherally located regions of the circular heatmap represent scenarios that are less frequently observed according to the observed historic data than a more centrally located region of the circular heatmap.

15. The system of claim 10, wherein one or more centrally located regions of the circular heatmap are rendered in a first color that signals normal activity associated with the plurality of metrics and one or more peripherally located regions of the circular heatmap are rendered in a second color that signals anomalous activity associated with the plurality of metrics.

16. Non-transitory computer-readable storage media storing instructions stored that are executable by one or more processing units to perform operations including:
   receiving data describing a plurality of metrics being monitored for a platform;
   generating a first visual that represents the data describing the plurality of metrics by:
      rendering a circular heatmap;
      rendering a dot that represents a combination of the plurality of metrics;
      positioning the dot relative to a center of the circular heatmap based on a comparison of each of the plurality of metrics to observed historic data for each of the plurality of metrics; and
      displaying the dot with a size relative to the circular heatmap that indicates a degree to which real-time data for at least one of the plurality of metrics is anomalous to observed historic data for the at least one of the plurality of metrics;
   generating a second visual that represents the data;
   receiving user input in relation to the second visual; and
   updating the first visual to re-render the circular heatmap and the dot based on the user input in relation to the second visual.

17. The method of claim 1 wherein the second visual is generated as a graph that represents the data.

18. The method of claim 1, wherein the updating includes updating both the first visual and the second visual based on the user input received in relation to the second visual.

19. The non-transitory computer-readable storage media of claim 16, wherein the first visual is generated using an unsupervised artificial neural network algorithm that projects high-dimensional data on to a two-dimensional map.

20. The non-transitory computer-readable storage media of claim 19, wherein the unsupervised artificial neural network algorithm comprises a self-organizing map (SOM) algorithm that accounts for time-series data and alters an output representation to produce the circular heatmap for rendering.

* * * * *